US010051990B2

(12) United States Patent
Peterson et al.

(10) Patent No.: US 10,051,990 B2
(45) Date of Patent: Aug. 21, 2018

(54) LINER FOR A VESSEL

(71) Applicant: Plascon Group, Traverse City, MI (US)

(72) Inventors: David E. Peterson, Traverse City, MI (US); Matthew P. Klein, Suttons Bay, MI (US)

(73) Assignee: Plascon Group, Traverse City, MI (US)

( * ) Notice: Subject to any disclaimer, the term of this patent is extended or adjusted under 35 U.S.C. 154(b) by 0 days.

(21) Appl. No.: 15/290,401

(22) Filed: Oct. 11, 2016

(65) Prior Publication Data

US 2017/0029170 A1    Feb. 2, 2017

Related U.S. Application Data

(63) Continuation-in-part of application No. 14/836,232, filed on Aug. 26, 2015, which is a
(Continued)

(51) Int. Cl.
| | |
|---|---|
| *B67D 7/06* | (2010.01) |
| *A47J 31/44* | (2006.01) |
| *B67D 3/00* | (2006.01) |
| *A47J 31/46* | (2006.01) |
| *A47J 31/06* | (2006.01) |

(Continued)

(52) U.S. Cl.
CPC ............ *A47J 31/44* (2013.01); *A47J 31/0605* (2013.01); *A47J 31/0615* (2013.01); *A47J 31/18* (2013.01); *A47J 31/46* (2013.01); *B67D 3/0035* (2013.01); *B67D 3/0067* (2013.01); *B67D 3/0083* (2013.01); *B67D 3/0096* (2013.01); *A47J 31/007* (2013.01); *B67D 2210/00062* (2013.01); *Y10T 29/49826* (2015.01)

(58) Field of Classification Search
CPC ................ B67D 3/0067; B67D 3/0083; B67D 2210/00062; A47J 31/46; B65D 47/06
USPC .......................................... 222/185.1; 383/64
See application file for complete search history.

(56) References Cited

U.S. PATENT DOCUMENTS

| | | |
|---|---|---|
| 172,929 A | 2/1876 | Newton |
| 261,354 A | 7/1882 | Johnson |
| (Continued) | | |

FOREIGN PATENT DOCUMENTS

| | | |
|---|---|---|
| EP | 0084699 A1 | 8/1983 |
| EP | 0777604 A1 | 6/1997 |
| (Continued) | | |

OTHER PUBLICATIONS

U.S. Appl. No. 14/533,658, filed Nov. 5, 2014, Klein, et al.
(Continued)

*Primary Examiner* — Patrick M Buechner
*Assistant Examiner* — Michael J Melaragno
(74) *Attorney, Agent, or Firm* — Fishman Stewart PLLC

(57) ABSTRACT

A beverage system comprising a vessel and a liner assembly. The vessel may include a spigot with a passage configured to receive at least a portion of a liner assembly. The liner assembly may include a flexible liner, a flexible tube, a rigid cuff, and a tamper evident connection therebetween. The flexible liner may be positionable in the vessel. The flexible tube positionable in the passage of the spigot. The rigid cuff disposed in at least a portion of the tube. The tamper evident connection may be provided between the tube, liner, and cuff.

19 Claims, 29 Drawing Sheets

Related U.S. Application Data continuation-in-part of application No. 14/533,658, filed on Nov. 5, 2014.

(60) Provisional application No. 62/240,388, filed on Oct. 12, 2015, provisional application No. 61/900,102, filed on Nov. 5, 2013.

(51) Int. Cl.
*A47J 31/18* (2006.01)
*A47J 31/00* (2006.01)

(56) References Cited

U.S. PATENT DOCUMENTS

| | | |
|---|---|---|
| 2,377,261 A | 5/1945 | Norris |
| 2,549,207 A | 4/1951 | Restenbaum |
| 2,601,319 A | 6/1952 | Norris et al. |
| 2,681,747 A | 6/1954 | Norris et al. |
| 2,718,985 A | 9/1955 | Tamminga |
| 2,815,887 A | 12/1957 | Ford et al. |
| 2,831,610 A | 4/1958 | Dennie |
| 2,861,718 A | 11/1958 | Winzen |
| 2,905,560 A | 9/1959 | Bender et al. |
| 3,081,911 A | 3/1963 | Scholle |
| 3,087,655 A | 4/1963 | Scholle |
| 3,089,622 A | 5/1963 | Westlake |
| 3,094,154 A | 6/1963 | Daniels |
| 3,096,912 A | 7/1963 | Rivette |
| 3,123,254 A | 3/1964 | Rabby et al. |
| 3,137,415 A | 6/1964 | Faunce |
| 3,138,293 A | 6/1964 | Roak et al. |
| 3,173,579 A | 3/1965 | Currie et al. |
| 3,178,063 A | 4/1965 | Cox |
| 3,212,681 A | 10/1965 | Weikert |
| 3,920,163 A | 11/1975 | Brown |
| 3,945,534 A | 3/1976 | Ady |
| 3,949,744 A | 4/1976 | Clarke |
| 3,976,277 A | 8/1976 | Basel et al. |
| 4,044,989 A | 8/1977 | Basel et al. |
| 4,076,147 A * | 2/1978 | Schmit ............... B65D 77/065 222/105 |
| 4,334,640 A | 6/1982 | van Overbruggen et al. |
| 4,375,864 A | 3/1983 | Savage |
| 4,445,539 A | 5/1984 | Credle |
| 4,475,670 A | 10/1984 | Rutter |
| 4,513,885 A | 4/1985 | Hogan |
| 4,516,691 A | 5/1985 | Christine et al. |
| 4,516,692 A | 5/1985 | Croley |
| 4,516,693 A | 5/1985 | Gaston |
| 4,528,161 A | 7/1985 | Eckert |
| 4,606,476 A | 8/1986 | Pocock et al. |
| 4,722,458 A | 2/1988 | Van Dal |
| 4,767,478 A | 8/1988 | Christine |
| 4,817,811 A | 4/1989 | Pfeiffer et al. |
| 4,898,303 A | 2/1990 | Large et al. |
| 4,911,399 A | 3/1990 | Green |
| 4,919,306 A | 4/1990 | Heaps, Jr. et al. |
| 4,948,014 A | 8/1990 | Rutter et al. |
| 5,064,096 A | 11/1991 | Illing et al. |
| 5,188,259 A | 2/1993 | Petit |
| 5,249,716 A | 10/1993 | O'Sullivan |
| 5,272,236 A | 12/1993 | Lai et al. |
| 5,334,180 A | 8/1994 | Adolf et al. |
| 5,375,741 A | 12/1994 | Harris |
| 5,407,099 A | 4/1995 | Heuke et al. |
| 5,516,693 A | 5/1996 | Vaeck et al. |
| 5,549,673 A | 8/1996 | Beale |
| 5,551,602 A | 9/1996 | Kurtzahn et al. |
| 5,639,015 A | 6/1997 | Petriekis et al. |
| 5,647,511 A | 7/1997 | Bond |
| 5,680,959 A | 10/1997 | Ettore et al. |
| 5,697,410 A | 12/1997 | Rutter et al. |
| 5,732,854 A | 3/1998 | Ruben et al. |
| 5,797,524 A | 8/1998 | Lentz |
| 5,884,648 A | 3/1999 | Savage |
| 5,901,761 A | 5/1999 | Rutter et al. |
| 5,983,964 A | 11/1999 | Zielinksi et al. |
| 6,053,360 A | 4/2000 | Rutter |
| 6,062,413 A | 5/2000 | Redmond |
| 6,073,807 A | 6/2000 | Wilford et al. |
| 6,116,467 A * | 9/2000 | Petriekis ............... B65D 77/06 222/105 |
| 6,131,767 A | 10/2000 | Savage et al. |
| 6,138,878 A | 10/2000 | Savage et al. |
| 6,168,074 B1 | 1/2001 | Petriekis et al. |
| 6,200,300 B1 | 3/2001 | Petriekis et al. |
| 6,202,370 B1 | 3/2001 | Miller et al. |
| 6,378,730 B1 | 4/2002 | Reddy et al. |
| 6,607,097 B2 | 8/2003 | Savage et al. |
| 6,609,636 B1 | 8/2003 | Petriekis et al. |
| 6,883,683 B1 | 4/2005 | Cunningham et al. |
| 7,316,329 B2 | 1/2008 | Wertenberger |
| 7,334,702 B2 | 2/2008 | Cunningham et al. |
| 7,452,317 B2 | 11/2008 | Graham et al. |
| 7,543,723 B2 | 6/2009 | Wilford et al. |
| 7,607,555 B2 | 10/2009 | Smith |
| 7,641,170 B2 | 1/2010 | Spray et al. |
| 7,721,755 B2 | 5/2010 | Smith et al. |
| 7,721,774 B2 | 5/2010 | Cook et al. |
| 7,721,921 B2 | 5/2010 | Ramusch et al. |
| 7,757,907 B2 | 7/2010 | Smith et al. |
| 7,922,212 B2 * | 4/2011 | Werth ............... A61M 39/12 285/242 |
| 7,980,424 B2 | 7/2011 | Johnson |
| 8,006,874 B2 | 8/2011 | Smith et al. |
| 8,052,012 B2 | 11/2011 | Kelly et al. |
| 8,083,109 B2 | 12/2011 | Smith et al. |
| 8,091,864 B2 | 1/2012 | Smith |
| 8,113,239 B2 | 2/2012 | Richards et al. |
| D676,320 S | 2/2013 | Richards et al. |
| 8,397,958 B2 | 3/2013 | Smith et al. |
| 8,459,510 B2 | 6/2013 | Richards et al. |
| 8,459,511 B2 | 6/2013 | Darby |
| 8,752,734 B2 | 6/2014 | Smith et al. |
| 8,757,441 B2 | 6/2014 | Smith et al. |
| 2004/0099687 A1 | 5/2004 | Magermans et al. |
| 2004/0104246 A1 | 6/2004 | Kawaguchi et al. |
| 2005/0269354 A1 | 12/2005 | Smith |
| 2007/0205216 A1 | 9/2007 | Smith |
| 2008/0029540 A1 | 2/2008 | Johnson |
| 2008/0245816 A1 | 10/2008 | Armstrong et al. |
| 2009/0084267 A1 * | 4/2009 | Furey ............... B01D 19/0042 96/194 |
| 2009/0127285 A1 | 5/2009 | Hoare et al. |
| 2010/0200613 A1 | 8/2010 | Smith et al. |
| 2010/0206900 A1 | 8/2010 | Dobrusskin et al. |
| 2010/0296858 A1 | 11/2010 | Richards et al. |
| 2011/0046585 A1 | 2/2011 | Weston |
| 2011/0309279 A1 | 12/2011 | Richards et al. |
| 2012/0223095 A1 | 9/2012 | Smith |
| 2013/0037568 A1 | 2/2013 | Smith et al. |
| 2013/0098947 A1 | 4/2013 | Richards et al. |
| 2013/0126561 A1 | 5/2013 | Smith et al. |
| 2017/0029170 A1 * | 2/2017 | Peterson ............... B67D 3/0035 |
| 2017/0057736 A1 * | 3/2017 | Georgelos ............... B65D 85/72 |

FOREIGN PATENT DOCUMENTS

| | | |
|---|---|---|
| EP | 1147055 A1 | 10/2001 |
| GB | 1416816 A | 12/1975 |
| WO | WO-2008014605 A1 | 2/2008 |
| WO | WO-2009019610 A2 | 2/2009 |
| WO | WO-2010100435 A1 | 9/2010 |
| WO | WO-2012073004 A2 | 6/2012 |
| WO | PCT/IB2014/065832 | 11/2014 |

OTHER PUBLICATIONS

U.S. Appl. No. 14/836,232, filed Aug. 26, 2015, Peterson.
U.S. Appl. No. 14/941,378, filed Nov. 13, 2015, Klein, et al.

(56) References Cited

OTHER PUBLICATIONS

International Search Report PCT/IB2014/065832.

\* cited by examiner

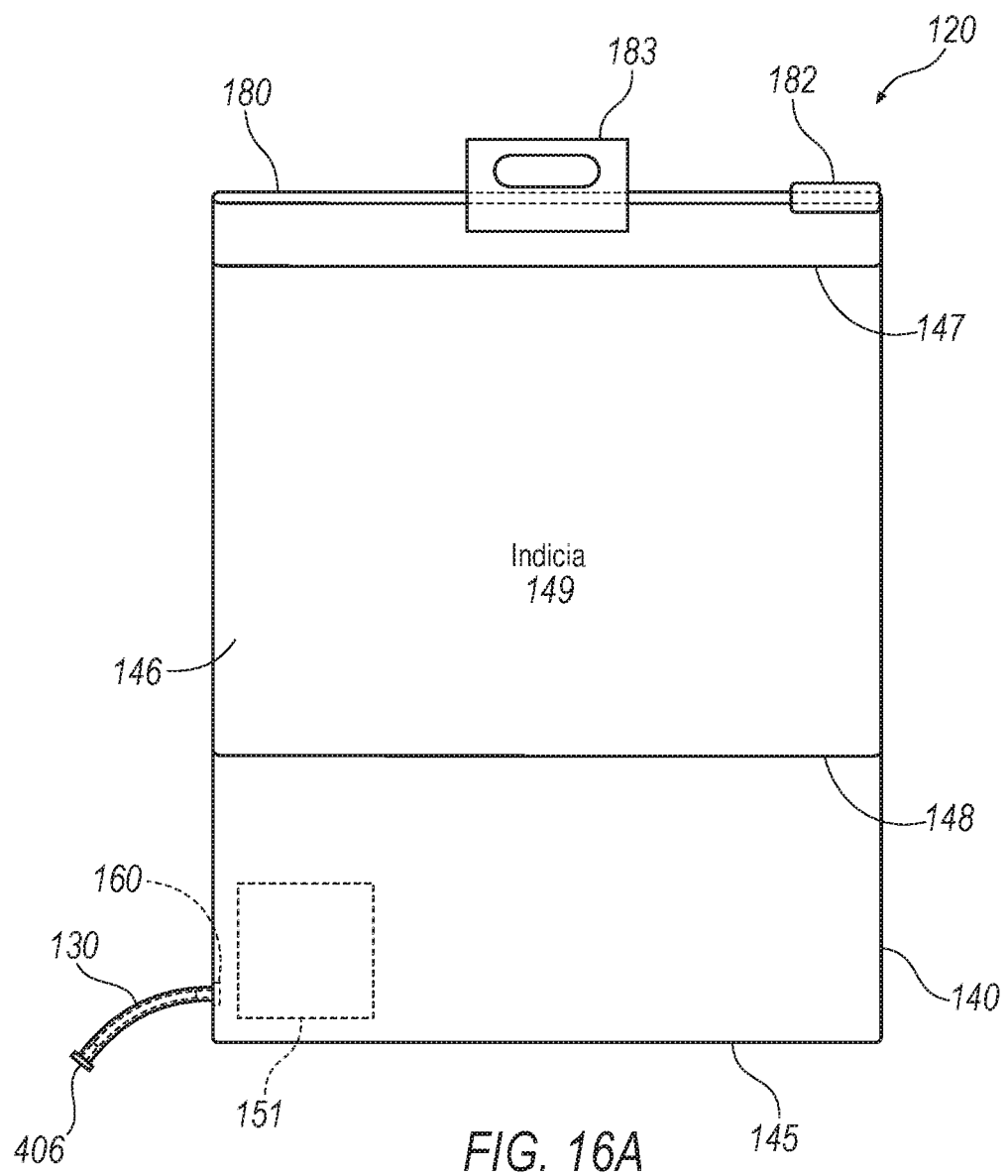

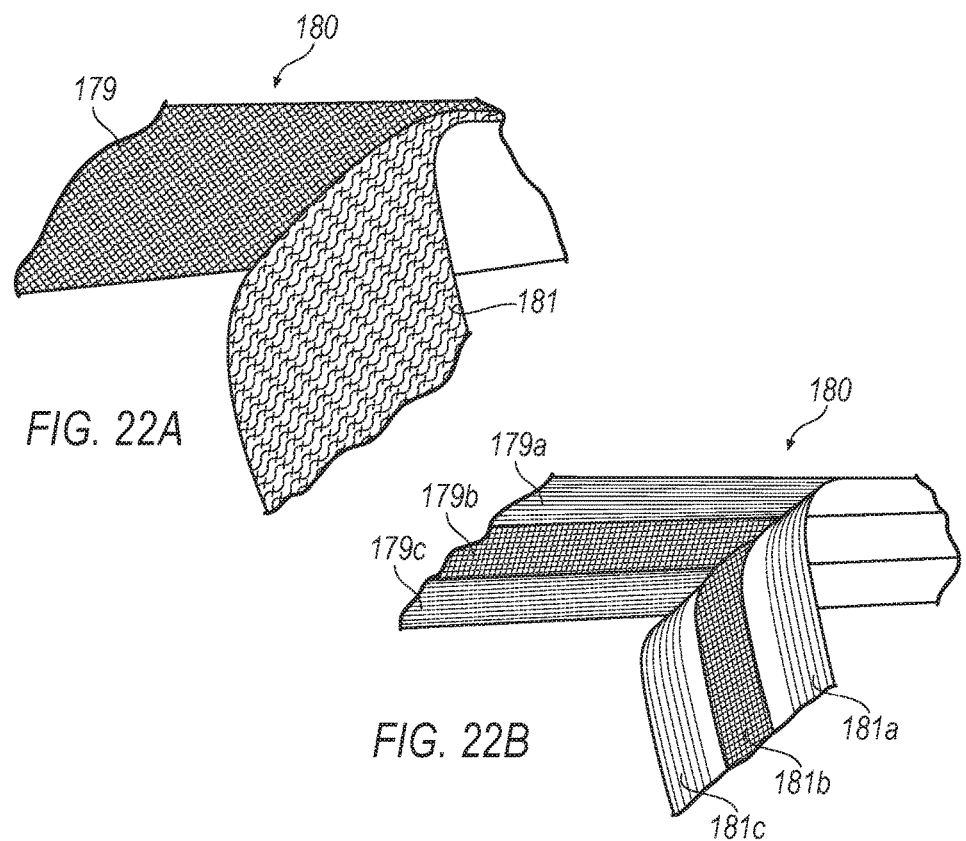
FIG. 22A
FIG. 22B
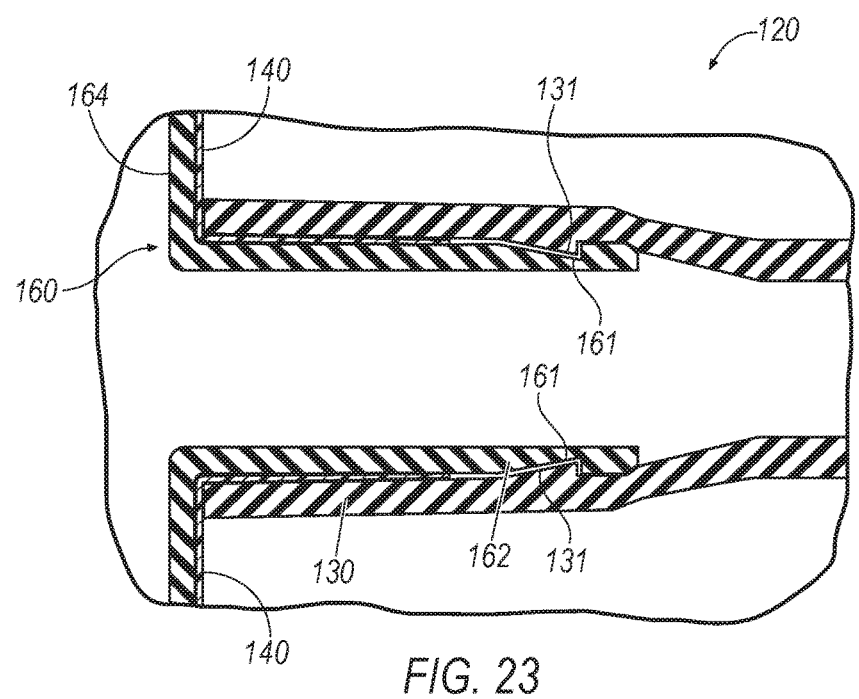
FIG. 23

LINER FOR A VESSEL

CROSS-REFERENCE TO RELATED APPLICATIONS

This application is based on and claims priority to Provisional U.S. Patent Application No. 62/240,388, filed on Oct. 12, 2015 and is a continuation-in-part application of and claims priority to U.S. patent application Ser. No. 14/836,232, filed Aug. 26, 2015, which is a continuation-in-part application based on and claims priority to U.S. patent application Ser. No. 14/533,658, filed Nov. 5, 2014, which is based on and claims priority to U.S. Provisional Patent Application No. 61/900,102, filed Nov. 5, 2013, all of which are hereby incorporated by reference in their entirety.

FIELD OF TECHNOLOGY

A fluid dispensing assembly, and more particular, a flexible, disposable, tamper-resistant, and sealable, food defense liner assembly for dispensing fluids with a vessel, beverage making and filling system, and methods of manufacturing and assembling the same.

BACKGROUND

A containment assembly such as urns or vessels may be used for holding and serving liquid or beverages. Typical assemblies may be constructed of metal and thus require cleaning after usage. In a restaurant environment, it is generally preferred to clean such vessels at the end of each shift so as to maintain cleanliness. However such a cleaning task requires increased man power and other resources and such is not preferred.

Another containment assembly uses a plastic bag assembly that is positioned within a containment vessel having a dispensing valve, which in turn is used to deliver beverages to consumers. These bag assemblies may be formed of a two-layer plastic sheet that is heat sealed on three sides with a spout that is heat sealed to an outer surface and over an aperture in one side of the plastic sheet. To fluidly connect with the dispensing valve, the typical spout is releasably received into a fitment connected to an elongated dispensing tube. As a result, the traditional spout may be physically separated from the elongated dispensing tube by the fitment. To dispense beverages, the elongated dispensing tube is passed into the dispensing valve of the containment vessel to be selectively operated by customers. Thus, typical plastic bag assemblies may include excess components thereby unnecessarily increasing material costs and complexity of installation and manufacture.

Further, typical bag assemblies are not tamper-resistant. After beverages have been dispensed or at the end of a work shift, the containment assembly should be cleaned by throwing away the plastic bag assembly. However, traditional bag assemblies include a releasable connection between the spout and fitment. This releasable connection may be utilized to reuse portions or all of the bag assembly, which may lead to unsanitary conditions. These traditional systems may be pulled apart and reassembled, promoting tampering with the releasable connection. As a result, there is a need for a tamper-resistant liner assembly.

Moreover, traditional bag assemblies lack a convenient mechanism to selectively seal the top of the bag with food defense in mind, e.g., closed during use and open during refilling. Traditional bags may be closed by folding over or bunching the top of the bag, but this fails to provide an effective seal at the top. Even if the top is knotted or permanently sealed, re-opening the bag my damage the top of the bag. Thus, it may be desirable to provide a selectively sealable container assembly.

Additionally, selectively sealable liners are a food defense mechanism deterring anyone from contaminating the liquid product easily. By closing the liner with the top seal a person must go through another time consuming step in order to willfully contaminate the product being dispensed. Additional benefits of the selectively sealable closed top are found when users move their dispensing vessels from one area to another with product for serving, reducing or eliminating spills from product sloshing out of the urn.

Other containment assembly designs employ expensive plastic bags that employ complex valves and dispensing systems that in turn may be used with a vessel. It would be helpful to provide a selectively sealable disposable container assembly that has improved functionality, a reduction in the number of working components, provides a tamper resistant connection, is a food defense mechanism, yet is more cost competitive for the beverage industry.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

FIG. 16A illustrates a perspective view of an alternative liner assembly, for example, having an integrated closure mechanism with a slide lock in a closed configuration;

FIG. 22A illustrates another integrated enclosure mechanism, e.g., using a hook and loop fastener;

FIG. 22B illustrates another integrated closure mechanism, e.g., having a plurality of interlocks;

FIG. 23 illustrates an enlarged side view of an alternative liner assembly;

DETAILED DESCRIPTION

The exemplary assembly may include a rigid vessel such as an urn, a liner such as a flexible fitted liner with an integrated closure mechanism configured to selectively provide open and closed configurations, a cuff such as a friction cuff configured to be positionable on an inner wall of the liner, a tube such as a flexible tube positionable on an outer wall of the liner, and a spigot that allows for the flexible tubing to be inserted therethrough. The vessel may further include a flow operator that pinches the tube to allow controlled dispensing.

The assembly may be configured to allow for sanitary dispensing of beverages for human consumption. The assembly may be configured such that the beverage may bypass the urn or the spigot for easy cleaning. Instead, the assembly may be configured such that the liquid is handled by the liner, cuff, and tube thereby minimizing or preventing contact between the liquid from the vessel.

A beverage system may comprise a beverage maker, a vessel, and a liner assembly. The liner assembly may be configured to be positioned within at least a portion of the vessel. The liner assembly may include a liner having an upper portion and a lower portion, an integrated closure mechanism on the upper portion and configured to selectively provide open and closed configurations, a flexible tube on the lower portion, and a cuff having an interlock surface.

Methods of using a beverage system are also contemplated. A method may comprise positioning a liner assembly in a vessel, positioning the liner assembly relative to a beverage maker, passing fluid from the beverage maker into the liner assembly, positioning a blocking member in the tube, sealing the integrated closure mechanism, and removing the liner assembly from the vessel.

Figure 1:
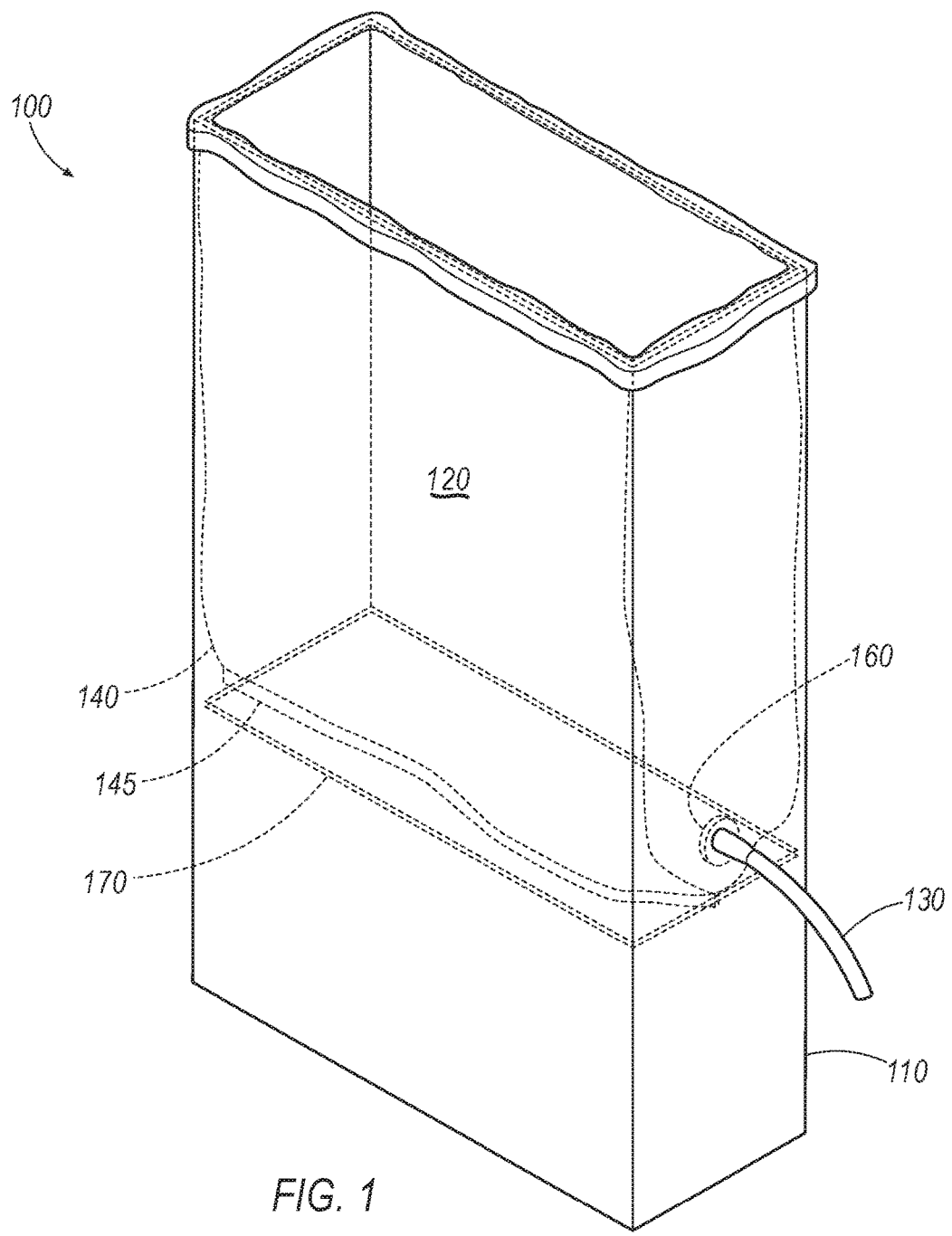
FIG. 1 illustrates a perspective view of an improved containment assembly.
Figure 2:
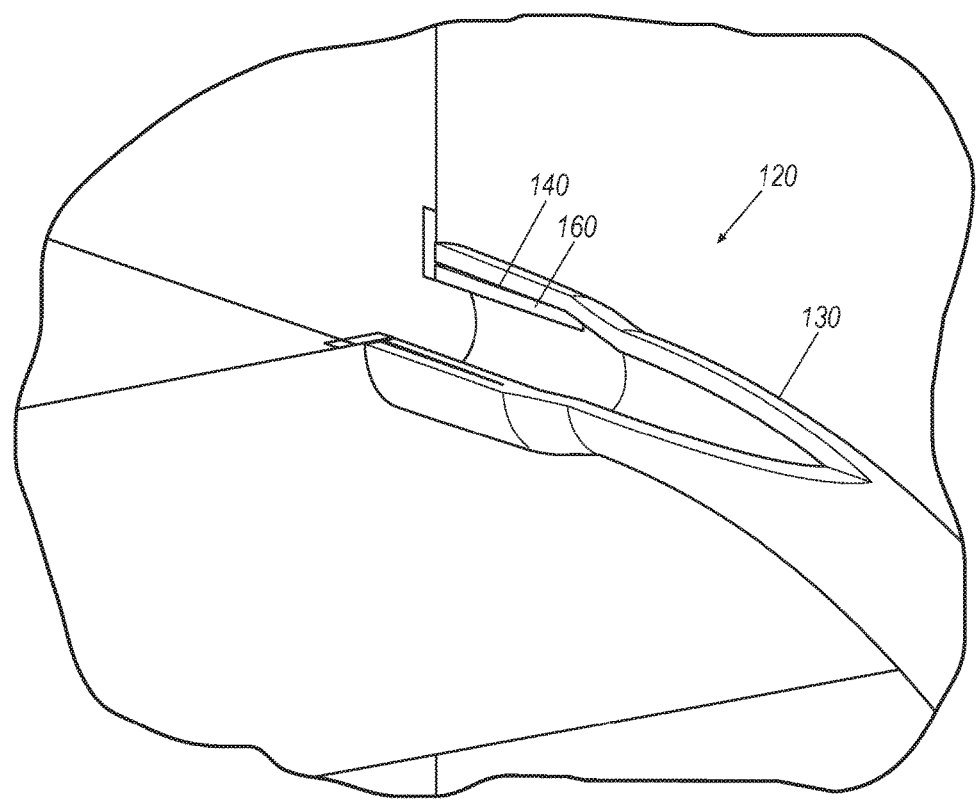
FIG. 2 illustrates an enlarged perspective view of the FIG. 1, for example, including a liner assembly having with a tube, a liner, and a cuff with a flange.

With reference to FIGS. 1-2, a containment assembly 100 may include a vessel 110 and a liner assembly 120. The vessel 110 may include any liquid or beverage dispenser such as a beverage or tea urn. As shown in FIG. 2, the liner assembly 120 may include a tube 130, a liner 140 such as a flexible liner, and a cuff 160 such as a rigid cuff with or without a flange. The liner 140 may be specially dimensioned and configured to match an internal cavity of the vessel 110 and the liner 140 and vessel 110 may include a tapered bottom portion to facilitate flow of liquid therefrom, as discussed in more detail below.

The liner assembly 120 may be configured to provide a seal between the liner 140 and the tube 130, for example, using cuff 160. Cuff 160 may include a unitary or one piece component configured to secure the liner 140 and tube 130 together. The liner assembly 120, using the cuff 160, may utilize an interlock such as a friction interlock. The interlock may be formed without heat or by cold or heat forming the components of liner assembly 120 to each other. The interlock may provide a permanent or tamper-resistant connection between any portions of liner assembly 120, for example, being destroyed in response to disassembly as a safety feature. The tamper-resistant connection may include a tamper evident connection with an indicator as discussed in further detail below.

The permanent or tamper-resistant connection may be formed by a mechanical interlock or cold or heat forming at least two or all of the tube 130, liner 140, and cuff 160 to each other. For example, the liner 140 and the tube 130 may be connected with the interlock so as to pinch the liner 120 between the tube 130 and the cuff 160, e.g., with the cuff 160 expanding the tube 130 radially outward and while the tube 130 applies a radially inward force from the tube 130 to the liner 120 that translates to the cuff 160. To provide this fluid tight seal, the cuff 160, such as a circular spacer with or without a flange, may be positioned inside the tube 130 thereby outwardly expanding a diameter of an inner surface of the tube 130. The liner 140 may be positioned between the tube 130 and the cuff 160. Thus, the cuff 160 may outwardly push the liner 140 against an inside surface of the tube 130 thereby providing a seal such as a liquid tight seal. As a result, the cuff 160 provides a unitary or one piece component that secures the liner 140 relative to the tube 130 thereby eliminating unnecessary components. Accordingly, the interlock may provide a fluid tight structure or seal thereby reducing leakage of liquid along the liner assembly 120 and may provide a permanent or tamper-resistant connection between the cuff 160, liner 140, and tube 130 that may not be removed without at least partially destroying at least a portion of the liner 140, e.g., prohibiting or obstructing reassembly of the components of liner assembly 120 and thus the overall functioning of liner assembly 120 with the liner 140.

Figure 3:
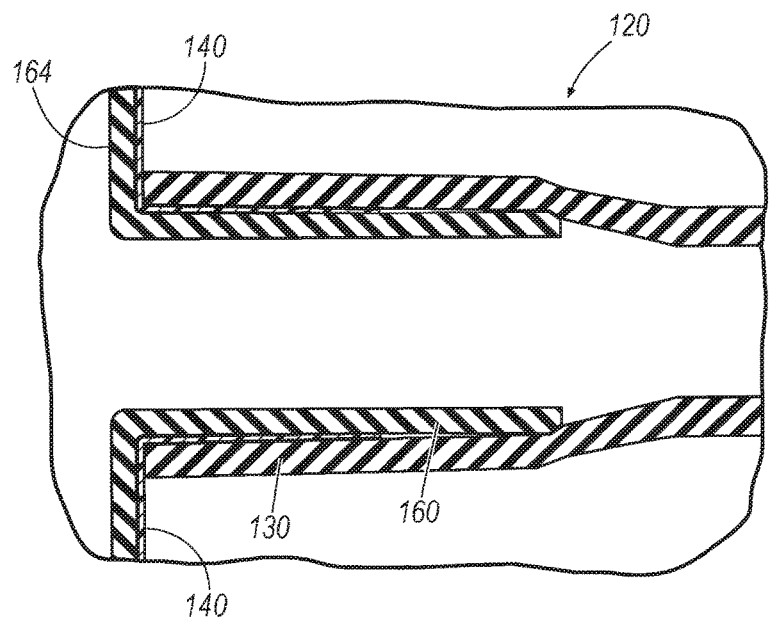
FIG. 3 illustrates an enlarged side view, for example, showing the liner assembly of FIG. 2.
Figure 5:
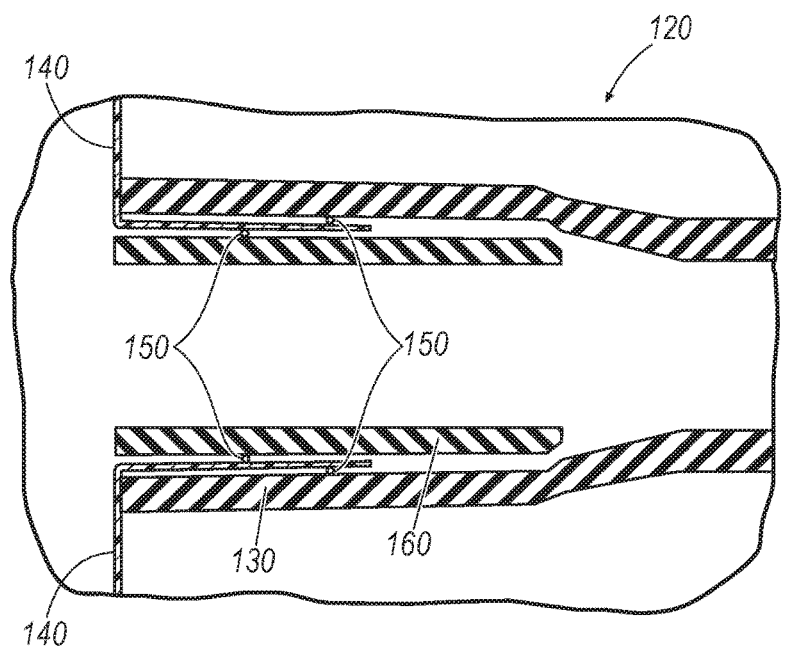
FIG. 5 illustrates an enlarged side view of another liner assembly having a tube, a liner, and a cuff, for example, without a flange.

Referring to FIGS. 3 and 5, the liner assembly 120 may include the liner 140 interposed between the tube 130 and the cuff 160. The cuff 160 may include an inner surface having a passage for receipt of liquid from the liner 140 and an outer surface that is dimensioned and configured to be received in and outwardly stretch an inner surface of the tube 130. The cuff 160 may be configured to be positioned with an axial force along the tube 130 and may be configured to expand the tube 130 thereby placing an outward force against the liner 140 and toward the inner surface of tube 130. In reaction, the tube 130 may place an inward force against the liner 140 and toward the outer surface of the cuff 160. Thus, the liner assembly 120 may be cold-formed or heat-formed with the axial force, outward force, inward force, or a combination thereof, thereby creating an interlock between the tube 130, liner 140, and cuff 160. For example, the cold-formed or heat-formed connection may include plastically forming the tube 130, liner 140, and cuff 160 together so as to form a physically joined or merged connection or may include elastically forming the tube 130, liner 140, and 160 together so as to form a forced or press fit connection. Accordingly, the liner 140 may be held between the tube 130 and the cuff 160 thereby providing a permanent or tamper-resistant connection between the cuff 160, liner 140, and tube 130 that may not be removed without at least partially destroying at least a portion of the liner 140, e.g., that cannot be reassembled to form a functional liner assembly 120.

The liner assembly 120 may be configured for a permanent or tamper-resistant connection between tube 130, liner 140, and cuff 160, for example, being at least partially destroyed in response to disassembly. For example, the liner assembly 120 (e.g., liner 140 and/or tube 130) may be configured to at least partially destruct, rip or tear in the event of disassembly thereby providing a permanent or tamper-resistant liner assembly 120 in response to disassembly, e.g., prohibiting or obstructing reassembly and reformation of a functioning liner assembly 120. Alternatively, the tube 130, liner 140, and cuff 160 may be connected using an interlock such as an adhesive or heat seal thereby providing a permanent or tamper-resistant liner assembly 120, for example, being at least partially destroyed in response to disassembly. In addition, liner assembly 120 may utilize any other destructive interlock between the tube 130, liner 140, and cuff 160 that results in at least partial destruction of at least one of the tube 130, liner 140, and cuff 160 during disassembly. Thus, the liner assembly 120 may be configured to provide a permanent or tamper-resistant connection, for example, being at least partially destroyed in response to disassembly.

Figure 4:
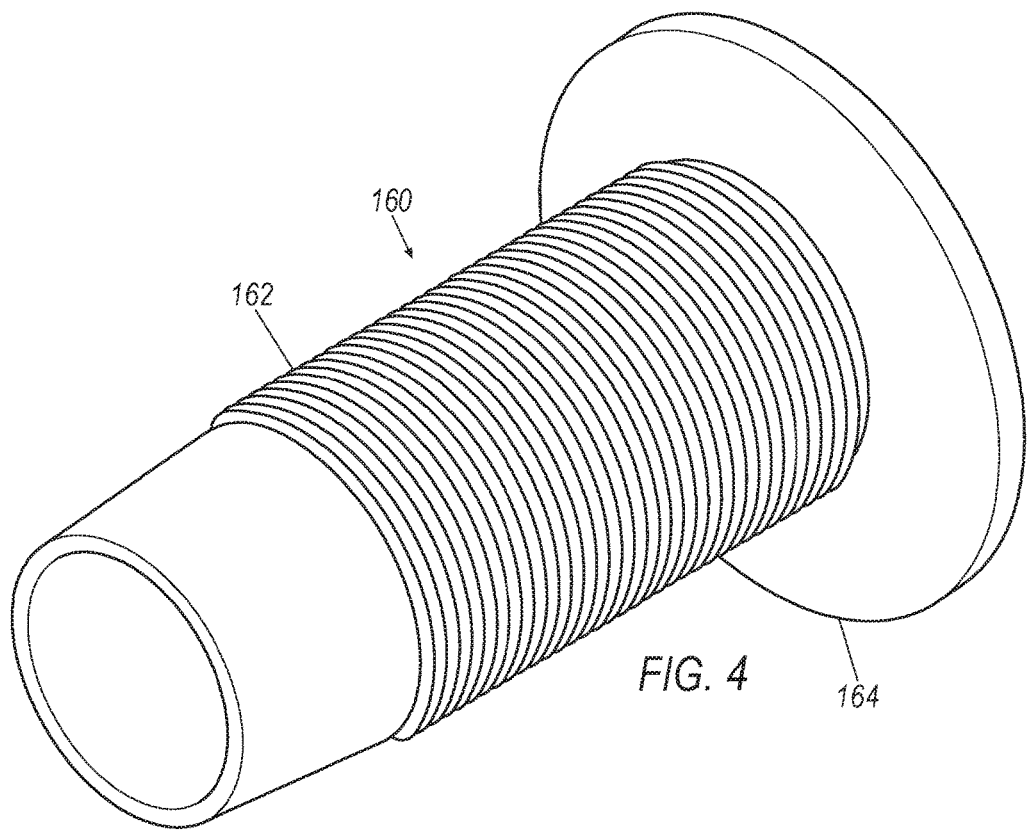
FIG. 4 illustrates an enlarged perspective view of a friction cuff, for example, with a flange.
Figure 6:
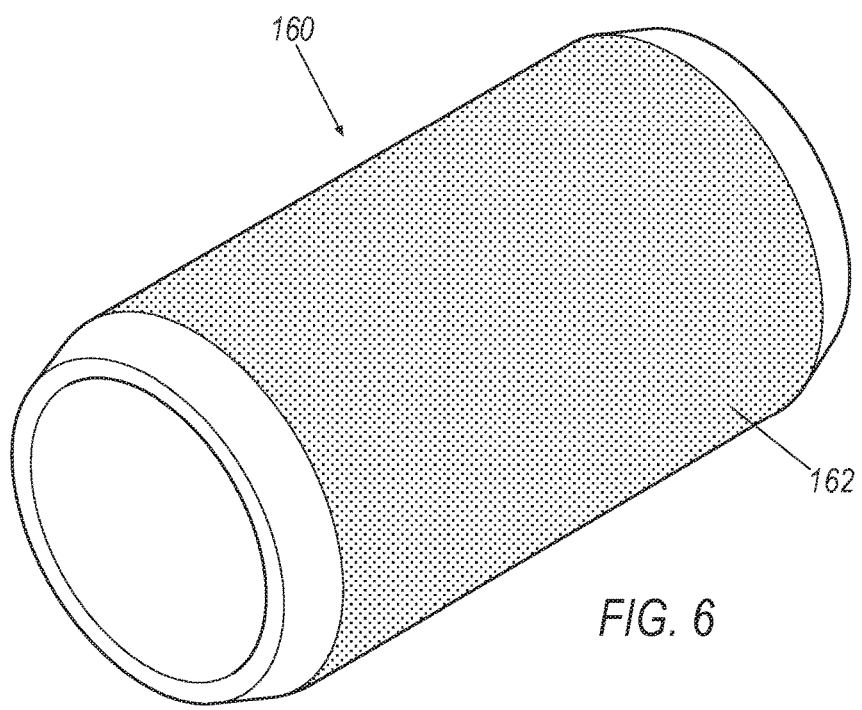
FIG. 6 illustrates an enlarged perspective view of another cuff, for example, without a flange.

The liner assembly 120 may include the cuff 160 with a flange 164 as shown in FIG. 4 or without a flange 164 as shown in FIG. 6. The cuff 160 may include a rigid cuff, for example, configured to resist bending of the flange 164 and maintain a passage therethrough. Further, the flange 164 may be configured to maintain the liner 140 in an outward position relative to the tube 130, for example, to resist blockage of the passage of the cuff 160. To maintain the outward position, the flange 164 may be configured to releasably contact or push against the liner 140 or may be adhered or heat sealed thereto. Alternatively, the cuff 160 may be without a flange 164, for example, to allow relative inward movement of the liner 140.

As mentioned above, the liner 140 may be affixed (e.g., permanently so as to prohibit reassembly of liner assembly 120 after being pulled apart) relative to the cuff 160 and tube 130. As shown in FIG. 5, the liner assembly 120 may include an optional adhesive 150 (e.g., a food grade adhesive) thereby permanently adhering the tube 130, liner 140, and cuff 160 together. Alternatively, the liner 140 may be affixed relative to the cuff 160 and tube 130 using a heat seal thereby permanently fusing the tube 130, liner 140, and cuff 160 together. By permanently fusing these components they are not intended to be separated.

As shown in FIGS. 4 and 6, the cuff 160 may include an interlock surface 162. The interlock surface 162 may be configured to provide or facilitate the interlock between the cuff 160, liner 140, and tube 130. The interlock surface 162 may include a plurality of barbs, ribs, or protrusions interposed by a plurality of recesses, thereby resulting in an increased surface area and a higher coefficient of friction. For example, this may create a plurality of ridges with alternating valleys as shown in FIG. 4. As another example, the interlock surface 162 may include a plurality of pores. Alternatively, the interlock surface 162 may be a smooth surface. Thus, the interlock surface 162 may facilitate the interlock and resulting seal between the cuff 160, liner 140, and tube 130.

Figure 7:
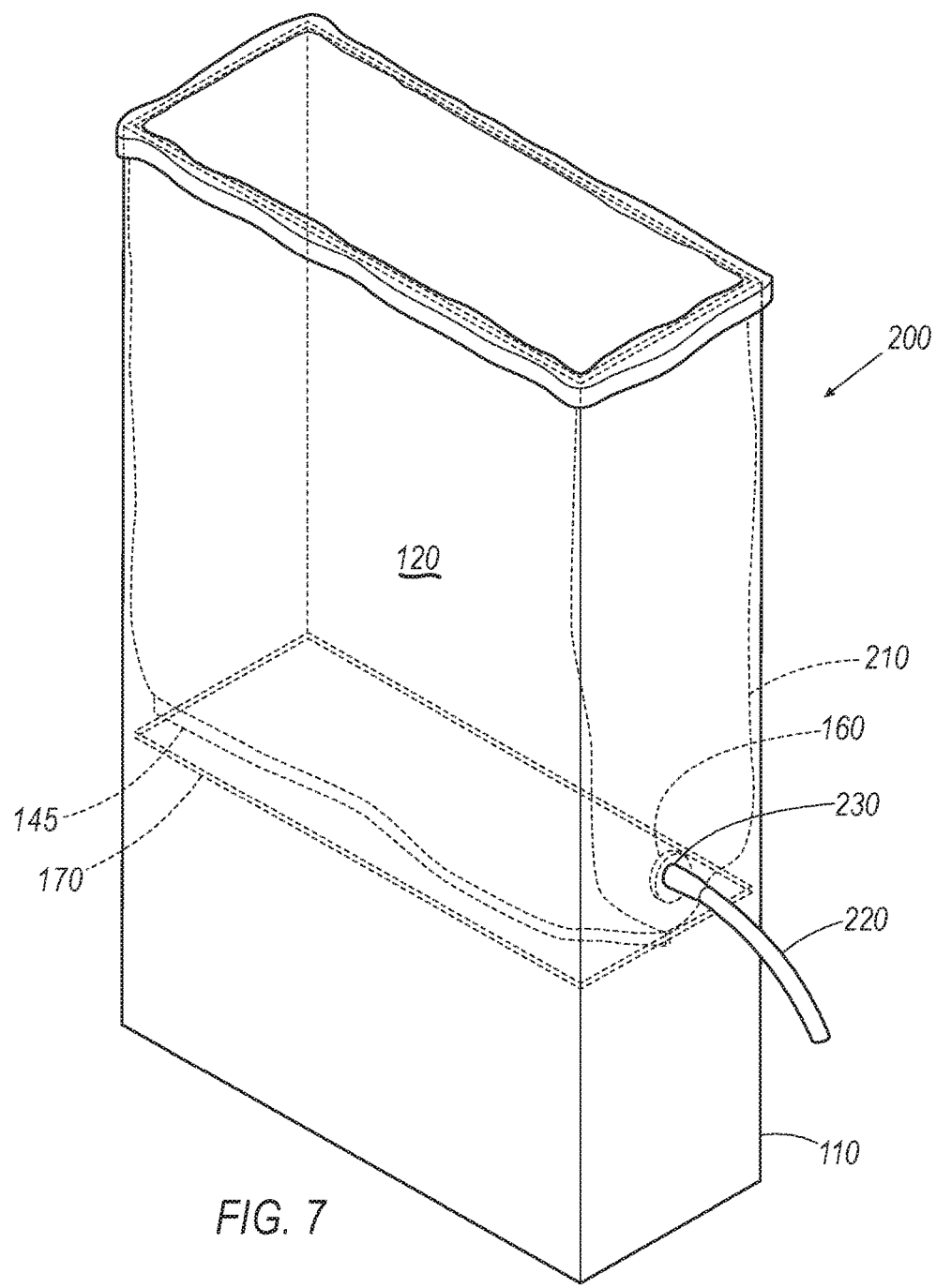
FIG. 7 illustrates a perspective view of a containment assembly having an alternative liner assembly.
Figure 8:
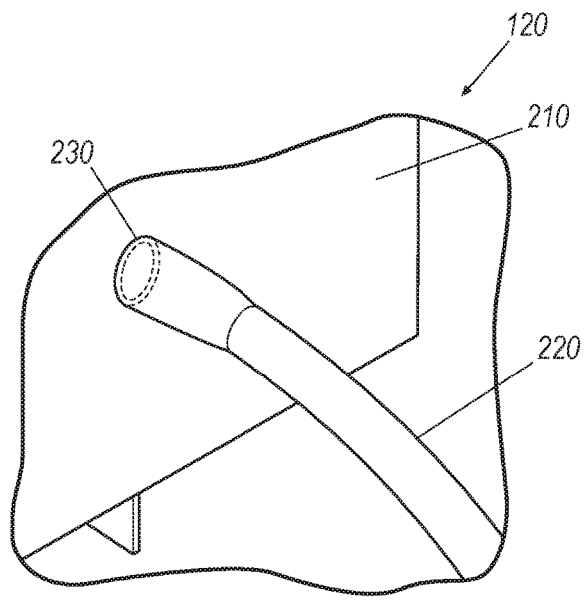
FIG. 8 illustrates an enlarged perspective view of the liner assembly of FIG. 7.
Figure 9:
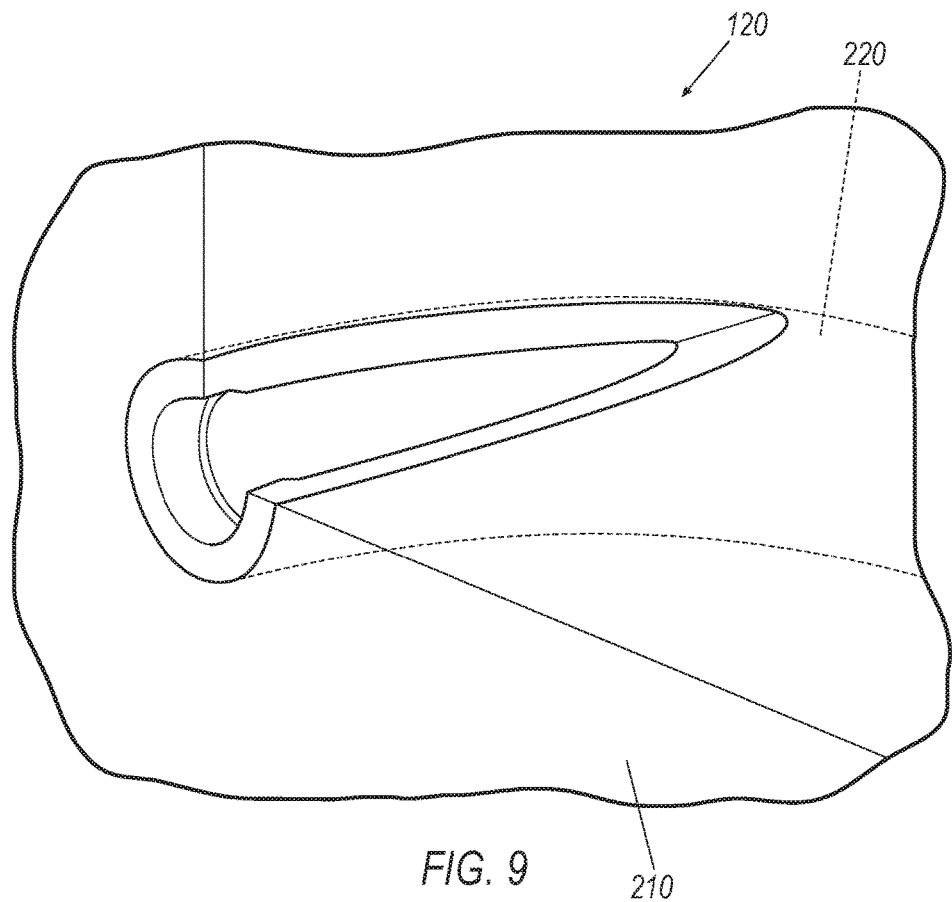
FIG. 9 illustrates another enlarged perspective view of the liner assembly of FIG. 7.
Figure 10:
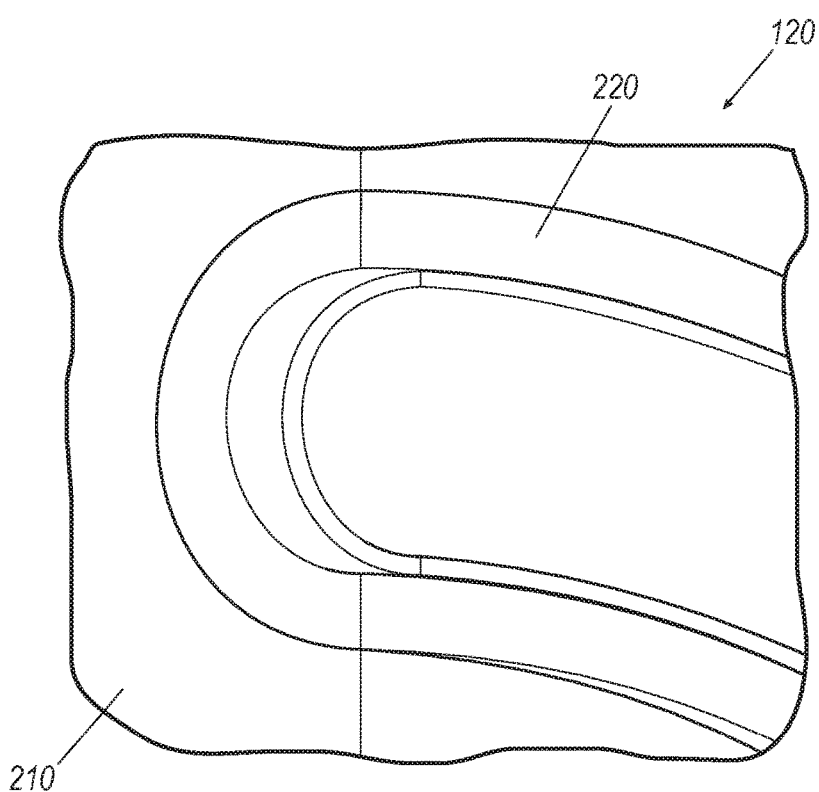
FIG. 10 illustrates another enlarged perspective view of the liner assembly of FIG. 7.

Referring to FIG. 7, the dimensions of the liner 140 are configured to allow for a minimum amount of liner material to be used for the specific vessel 110 that is being lined. This reduces the number of folds created when the liner is installed into the vessel and filled, thus improving drainage of the liquid product. The liner 140 may be constructed from a tube of flexible material having one end sealed closed. The tube 130 is attached to the liner 140, which may occur proximal to the sealed end of the liner 140 at a point configured to assist in draining the beverage product in its entirety from the liner 140. Further, the liner 140 may be dimensioned and configured to provide an optimum size to reduce material usage and improve draining with respect to the vessel 110. In addition, the liner 140 may be optimized or dimensioned according to a vessel length, a vessel height, a vessel opening perimeter or circumference, and a spigot location relative to a length and a width of the vessel 110.

The liner 140 may be made from flat tubing, gusseted tubing, sheeting, or a flexible pouch having opposed sidewalls that may be optionally connected at peripheral edges. The liner 140 may include a lower portion 145 that may be cut and formed by a heat seal, e.g., thereby forming a bottom. The lower portion 145 may include a gusset as shown in FIGS. 1 and 7 or a flat edge as shown in FIG. 13, described in further detail below. The liner 140 may be any shape configured to form-fit to the vessel 110. The liner 140 may be configure to be stretched over the top edge of the vessel 110, for example, to keep the liner 140 from sliding down inside of the vessel 110 upon being filled.

Methods of manufacturing the liner 140 are contemplated. Methods may include converting raw material into roll stock and converting the roll stock into individual liners 140. The raw material may be in the form of roll stock, for example, dimensioned according to a vessel length and a vessel width of the vessel 110. The roll stock may then be converted by cutting (e.g., using heat or a cutter) the liner 140 to an optimum liner length (e.g., a vessel height of vessel 110) thereby resulting in an end open at the top of the liner 140 and a bottom of the liner 140 that is sealed.

Figure 42:
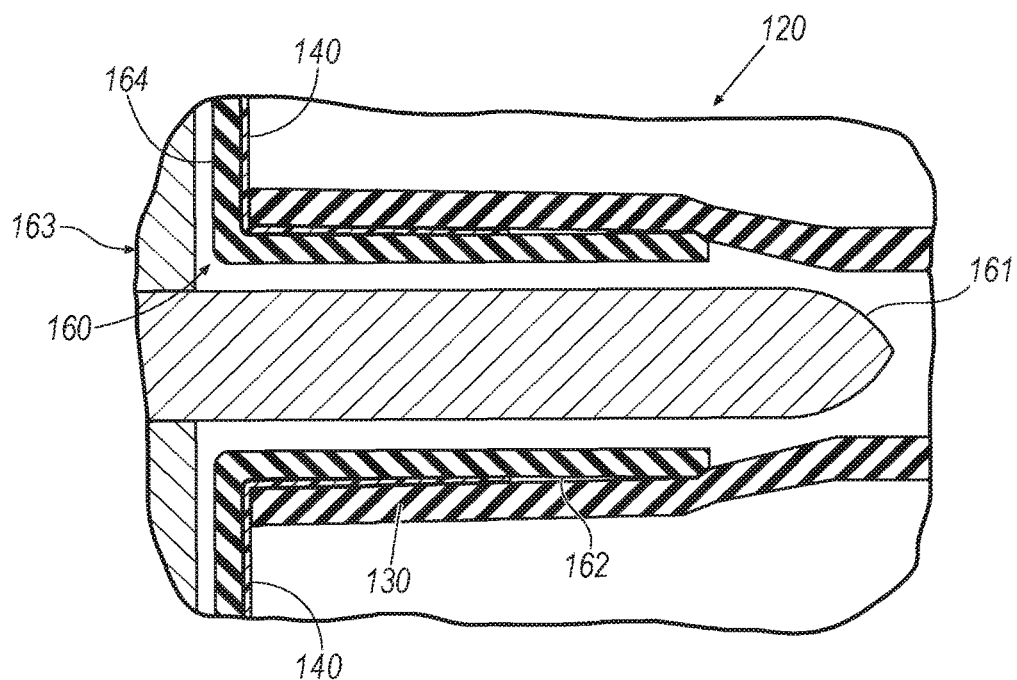
FIG. 42 illustrates an enlarged side view, for example, of an exemplary liner assembly positioned on an assembly tool.

Furthermore, methods of manufacturing and assembling the liner assembly 120 are contemplated. A method may include positioning the cuff 160 (e.g., a friction cuff) over a locating stud 161 of an assembly tool or platform 163 as shown in FIG. 42, positioning the liner 140 over at least a portion of the cuff 160 and locating stud, and pushing tubing 130 over at least a portion of the liner 140, cuff 160, and the locating stud 161, thereby outwardly expanding the tube 130 and puncturing the liner 140. In use, puncturing the liner 140 allows fluid to flow from the liner 140 through the cuff 160, and into the tube 130. As such, the tube 130, liner 140, and cuff 160 are held together (e.g., permanently such that the liner assembly 120 prohibits or obstructs reassembly and formation of a functional, working condition after disassembly) by an inward force from the elasticity of the tube 130 and a friction force between the tube 130, liner 140, and cuff 160. Alternatively or in addition, any or all of tube 130, liner 140, and cuff 160 may be held together (e.g., permanently) using an interlock such as an adhesive or a heat seal therebetween. Accordingly, the liner assembly 120 may be configured with layers having an order from inside to outside as follows: the cuff 160 (e.g., a friction cuff), the liner 140, and the tubing 130 (e.g., flexible tube). In addition, a method may further include removing the liner assembly 120 from the assembly tool or platform and packing the liner assembly 120 for distribution.

Referring to FIGS. 7-10, an assembly 200 may include a vessel 110 and a liner assembly 120. The vessel 110 may include a support surface 170. The liner assembly 120 may include a liner 210 (e.g., a fitted flexible liner), a tube 220 (e.g., a flexible tubing), and a heat seal 230. The liner 210 may include a single piece heat sealed liner dimensioned and figured for the vessel 110. The liner 210 may be directly attached to a tube 220 with the heat seal 230. The heat seal 230 may provide a permanent or tamper-resistant connection, for example, being at least partially destroyed in response to disassembly. The heat seal 230 may be created by using a tool such as a heat probe. The heated probe may push the liner 210 into an inner surface of the tube 220 thereby sealing an outer surface of the liner 210 at the point at which the liner 210 contacts the inner surface and end of the tube 220. Liner 210 and tube 220 may be interchangeable with liner 140 and tube 130, respectively.

The liner 210 may be dimensioned and configured to allow for a minimum amount of liner material to be used for the specific vessel 110 being lined. This may reduce the number of folds created when the liner 210 is installed into the vessel 110 and filled, thus improving drainage of the liquid or product. The liner 210 may be constructed from a tube 220 of flexible material having one end sealed closed. The tube 220 and liner 210 may be permanently attached, which may occur proximal to the sealed end of the liner 210 at a point configured to assist in draining the product in its entirety from the liner 210. The liner 210 may then be placed over a locating board with heat probe for sealing. The tube 220 may then be placed above the heat probe and a foot operated pedal may then pushes the heat probe through a hole in the locating board thereby forming the heat seal 230. Accordingly, the liner assembly 120 may include the layers from inside to outside as follows: liner 210, heat seal 230, and tube 220.

Figure 11:
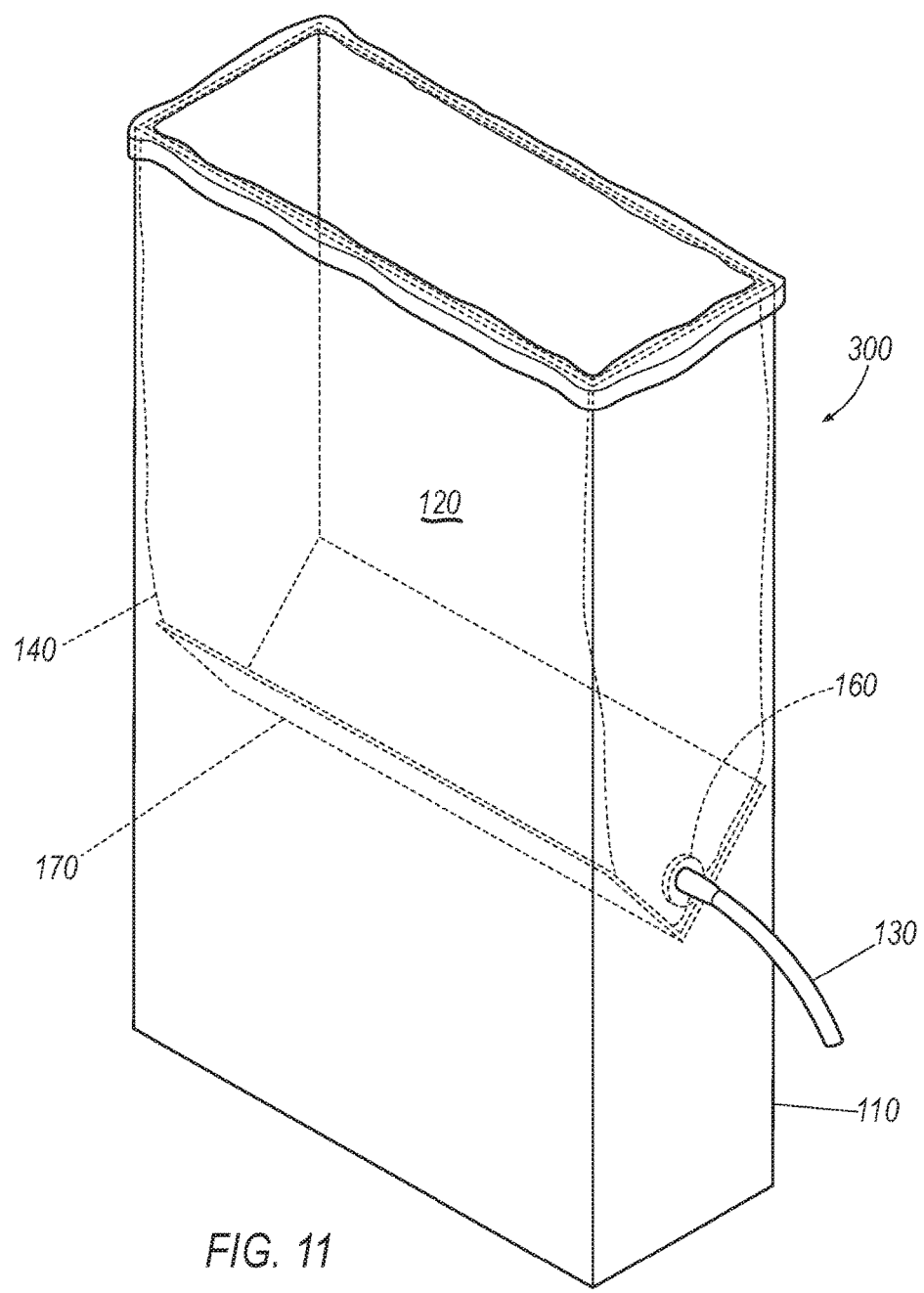
FIG. 11 illustrates a perspective view of an alternative containment assembly.
Figure 12:
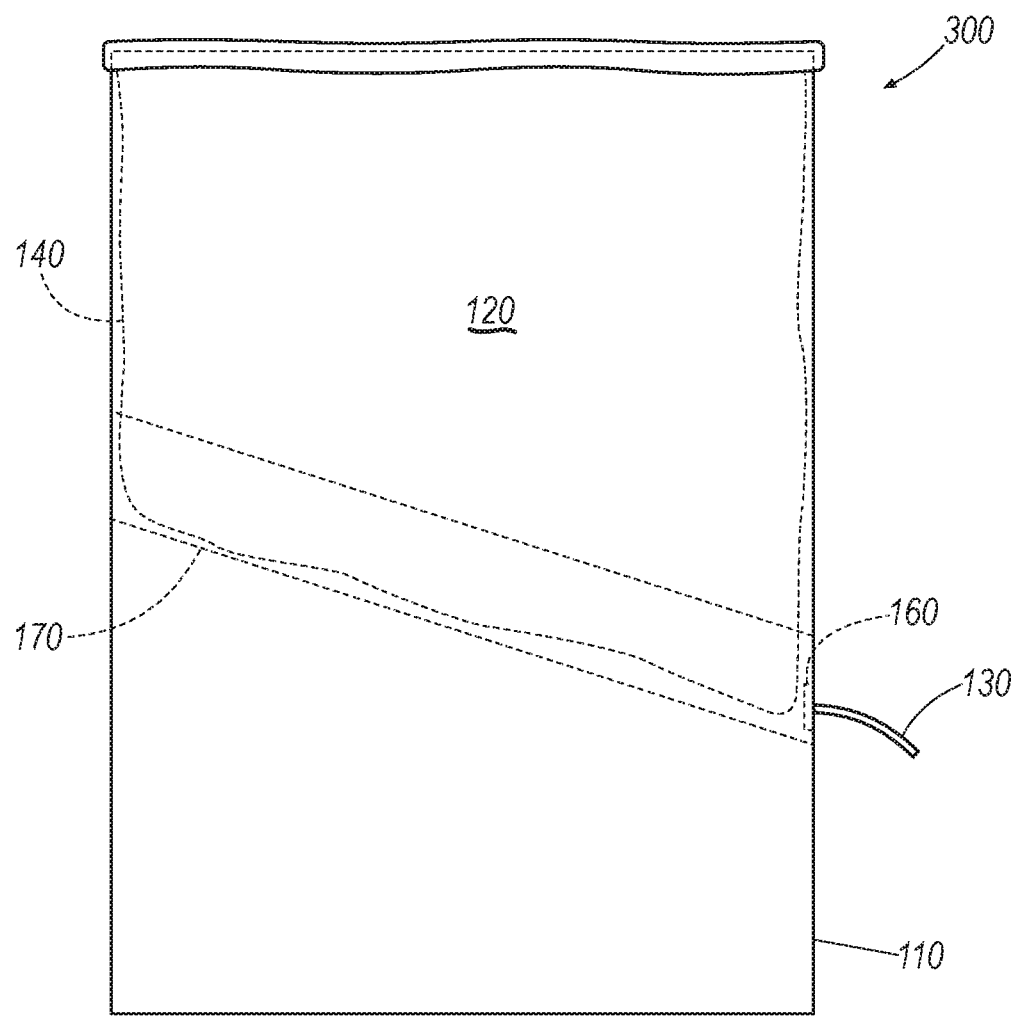
FIG. 12 illustrates a side view of an alternative containment assembly.

Referring to FIGS. 11 and 12, an assembly 300 may include the vessel 110 and the liner assembly 120 The liner 140, the vessel 110, or both the liner 140 and vessel 110 may be configured with a tapered structure, for example as a bottom of the liner 140 and/or the support surface 170 of the vessel 110. For example, the tapered structure may optimize utilization of fluid in the liner 140 by urging fluid toward the tube 130. The tapered structure may include any structure configured to urge liquid toward the tube 130 of the liner assembly 120 and/or spigot of the vessel 110. The tapered structure may include any number of tapered surfaces as part of the vessel 110 or liner 140 that are configured to angle or slope liquid toward the spigot of the vessel 110. The tapered structure may include two tapered surfaces forming a v-shape (e.g., along a lengthwise, central axis of the vessel 110) as shown in FIG. 11, may be tapered downwards from a first end (e.g., a backend) to a second end (e.g., a front end) of the vessel 110 as shown in FIG. 12, or may be a combination thereof. For example, the bottom of liner 140 or the support surface 170 of vessel 110 may include the tapered structure. Moreover, the liner 140 may have any number of gussets or may be heat sealed to form a tapered structure as shown in FIGS. 11 and 12. As such, the vessel 110 and liner 140 may be configured to taper fluid out of the liner 140 and toward the tube 130 thereby optimizing usage of the fluid.

Figure 13A:
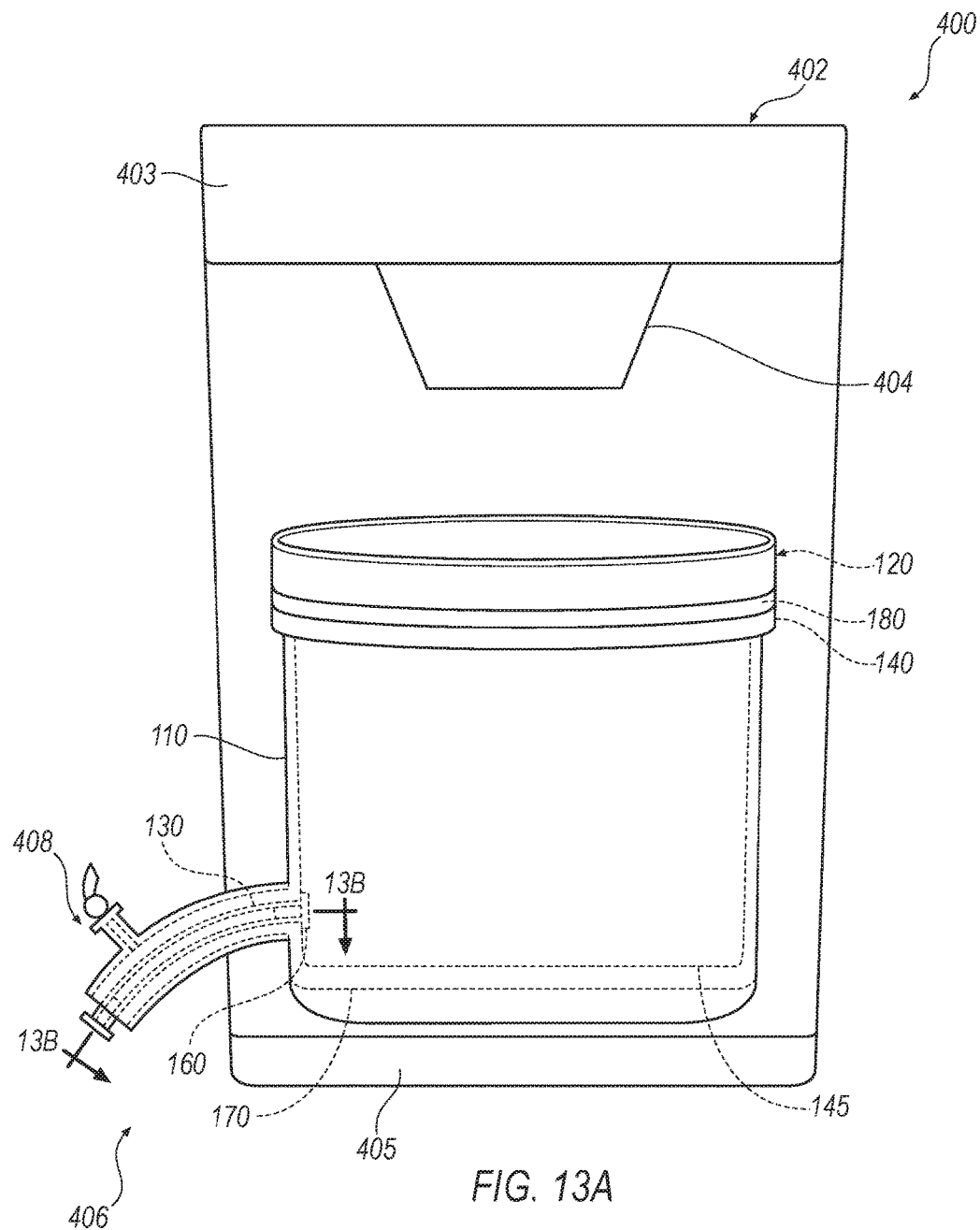
FIG. 13A illustrates a front view of a system of the present disclosure.
Figure 13B:
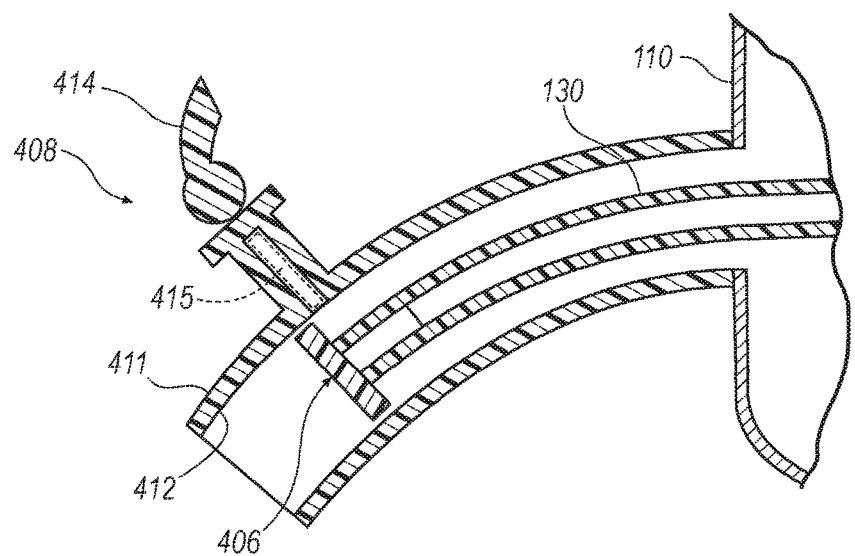
FIG. 13B illustrates a cutaway view of the system of FIG. 13A.

Referring to FIGS. 13A-B, a beverage system 400 may include a beverage maker 402, vessel 110, and liner assembly 120. The beverage maker 402 may include a tea or coffee maker. The beverage maker 402 may include a fluid source 403 configured to dispense or heat fluid such as water, a filter portion 404 configured to pass the fluid through a flavor source such as tea leaves or coffee beans (e.g., ground), and a base portion 405 configured to provide support for and position the brewing portion 402 and filter portion 404 over the vessel 110. The liner assembly 120 may be received in and folded over the vessel 110, e.g., to receive fluid in the form of tea or coffee or other beverage.

As shown in FIG. 13B, the vessel 110 may include a spigot 408. The spigot 408 may have a spigot passage 412 dimensioned to receive tube 130. The spigot 408 may include a flow operator 414 and a pin 415. The flow operator 414 may be moved to provide a plurality of flow rates by selectively opening and closing the tube 103 in open and closed positions and any number of intermediary positions therebetween. The flow operator 414 may be operatively connected to a pin 415 to provide an obstruction force to selectively pinch or collapse the tube 130. By movement in the opposite direction, the flow operator 414 may release the tube 130, thereby allow fluid to flow for dispensing of the beverage or the tube 130 to pass therethrough for removal of the liner assembly 120.

Figure 14A:
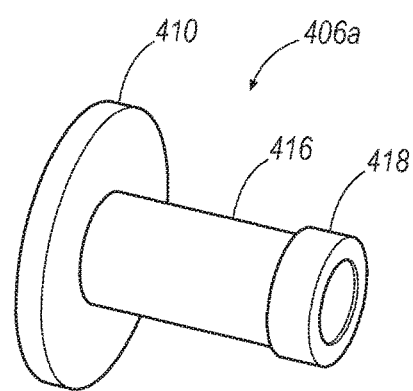
FIG. 14A illustrates an exemplary tube blocking member of the present disclosure.
Figure 14B:
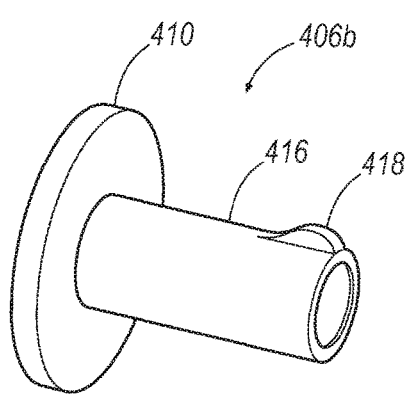
FIG. 14B illustrates an alternative tube blocking member of the present disclosure.

Referring now to FIGS. 13B, 14A and 14B, the liner assembly 102 may include, for example, a blocking member 406. The blocking member 406 may be selectively received in the tube 130 to block fluid flow (e.g., to move or store the liner assembly 102) and selectively removed from the tube 130 to allow fluid flow (e.g., to dispense a beverage). The blocking member 406 may include a head 410 configured to pass though spigot passage 412 and provide a seal relative to the tube 130. The blocking member 406 may further include a shaft 416 and a leading end 418 configured to provide an outward force relative to the tube 130, thereby securing the blocking member 406 relative to the tube 130. The blocking member 406 may include a leading end 418 with a circumferential extrusion such as a band or ridge about the shaft 416 as shown in FIG. 14A or a pointed extrusion such as a prong as shown in FIG. 14B.

Figure 15A:
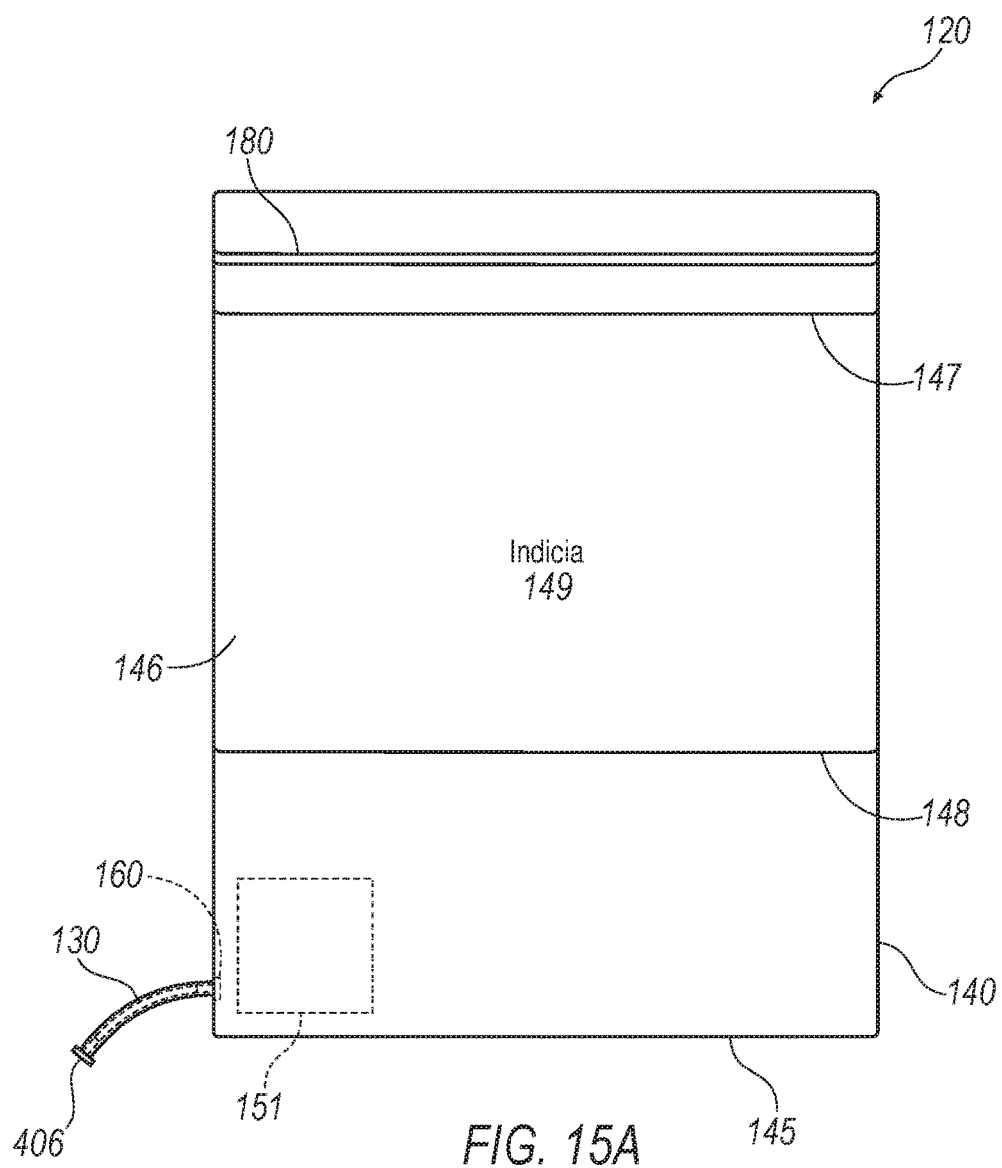
FIG. 15A illustrates a front view a liner assembly, for example, with an integrated closure mechanism in a closed configuration.
Figure 15B:
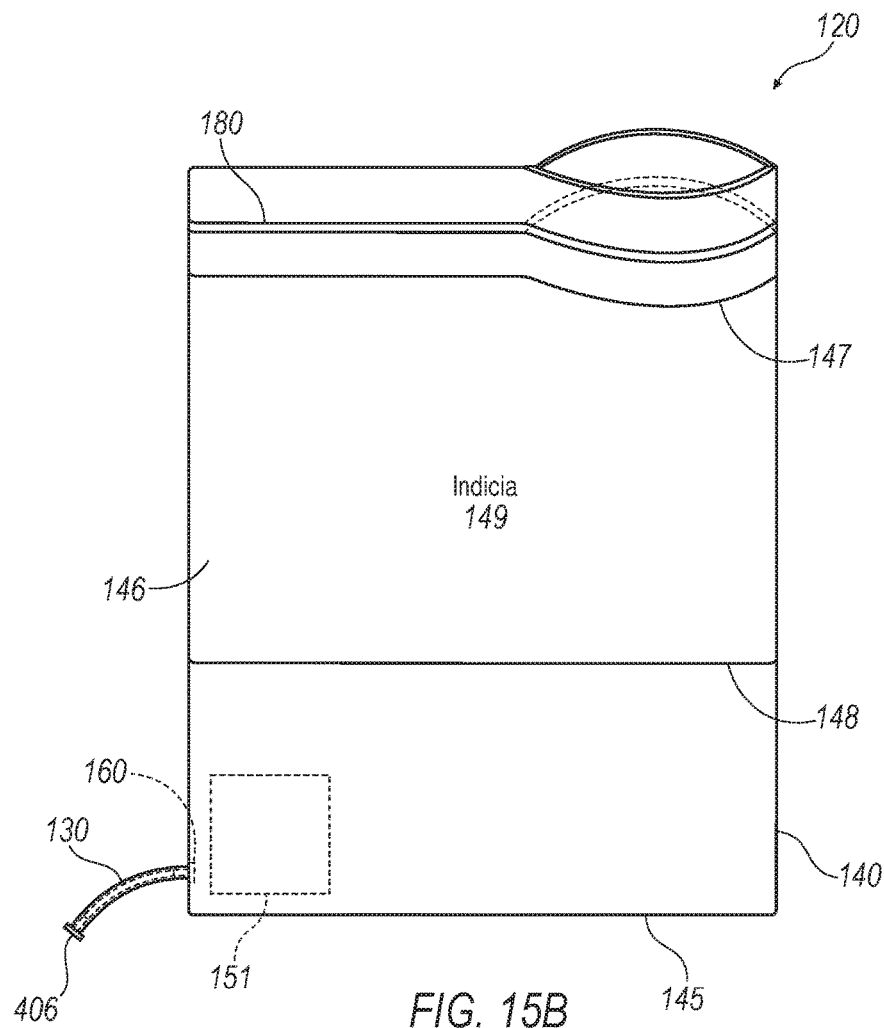
FIG. 15B illustrates the liner of assembly of FIG. 15A, for example, in an open configuration.
Figure 16B:
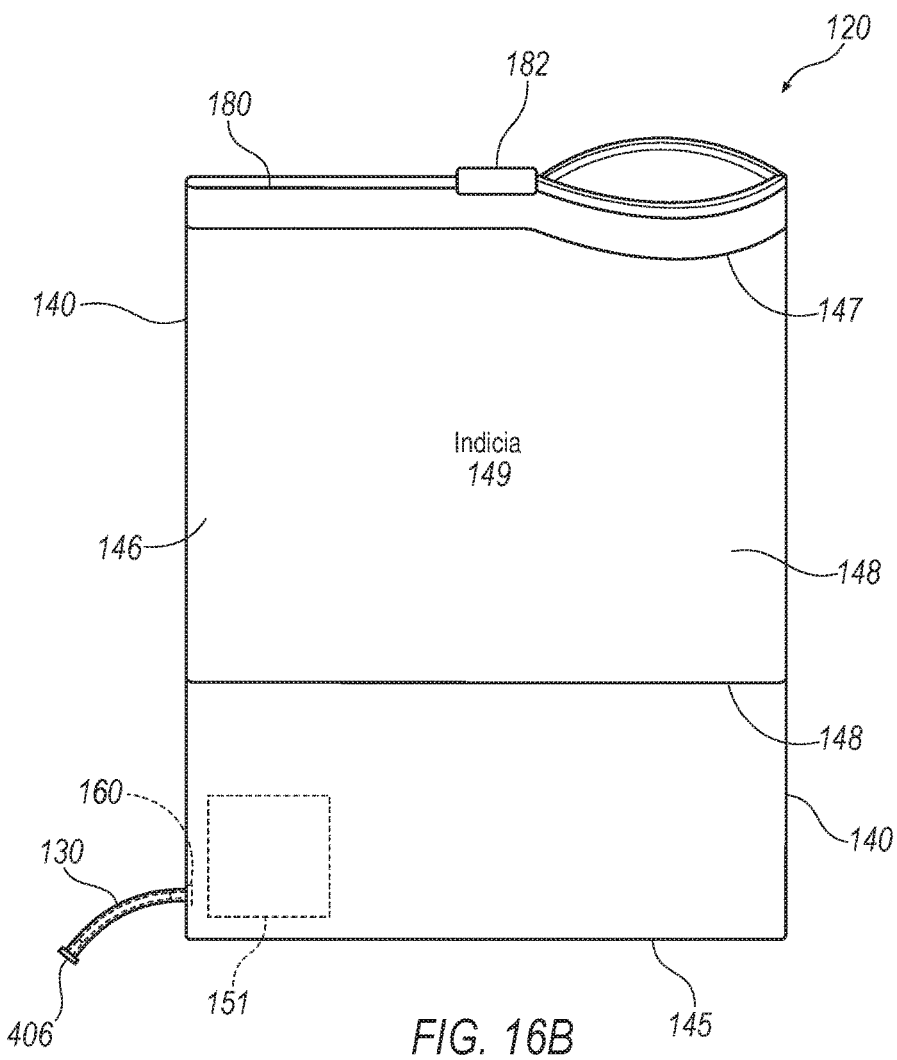
FIG. 16B illustrates a perspective view of the liner assembly of FIG. 16A, for example, in an open configuration.

Referring to FIGS. 15A-B and 16A-B, the liner assembly 120 may be configured to selectively sealed. The liner assembly 120 may include an integrated closure mechanism 180 having first and second portions providing an interlock along an upper portion the liner assembly 120, e.g., a top opening of the liner assembly 120. The integrated closure mechanism 180 may be configured to selectively seal first and second portions of the liner assembly 120 relative to each other, e.g., using interlocking ridges along the integrated closure mechanism 180 to provide a liner seal. As shown in FIG. 15A, the integrated closure mechanism 180 may provide a closed configuration to seal the interior of or retain the fluid in the liner assembly 120. As further shown in FIG. 15B, the integrated closure mechanism 180 may provide a partially or entirely open configuration to provide access to the interior of or to refill fluid into the liner assembly 120. The liner assembly 120 may also include a slide lock 182 that may slide along the integrated closure mechanism 180 between a closed configuration as shown in FIG. 16A and an open configuration as shown in FIG. 16B.

As another example, the liner assembly 120 may include a compartment 151. The compartment 151 may include a woven or mesh material configured to hold a flavor source such as tea leaves or coffee beans (e.g., ground). The compartment 151 may be integral to the liner 140 or positioned in or secured relative to the liner 140. Fluid such as water may be provided in the liner assembly 120, pass through or against the compartment 151 thereby mixing the fluid and the flavor source, and pass out of the liner assembly 120 as a beverage such as tea or coffee.

Figure 15C:
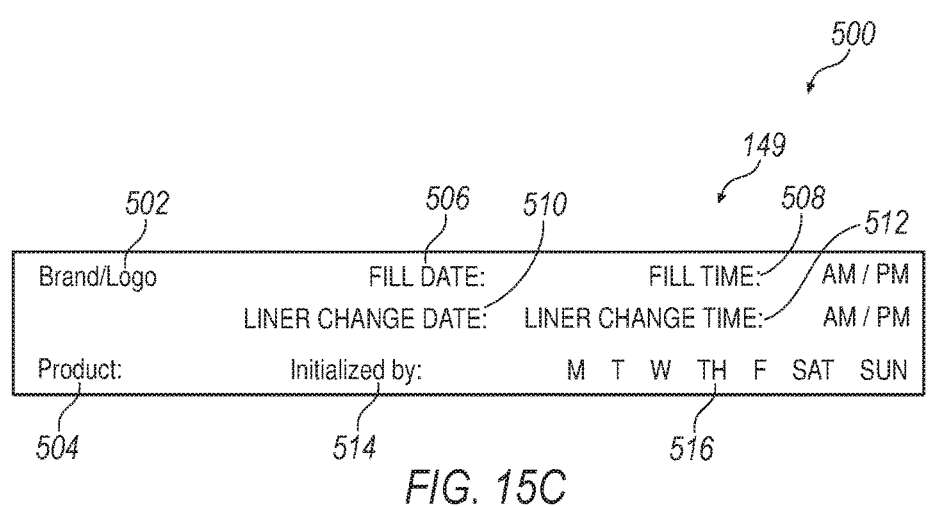
FIG. 15C illustrates exemplary indicia of the present disclosure.

The liner assembly 120 may include a label block 146 as further shown in FIG. 13. The label block 146 may extend all or any portion of the length and width of the liner 140, e.g., between an upper boundary 147 and a lower boundary 148. The label block 146 may include or may be configured to receive indicia 149. As shown in FIG. 15C, indicia 149 may include a brand/logo marker 502, product marker 504 regarding the contents such as a beverage type (e.g., a type of coffee or tea), fill date marker 506, fill time marker 508, liner change date marker 510, liner change time marker 512, initials marker 514, and day of the week marker 516, e.g., associated with preparation of the beverage or installation or manufacturing of the liner assembly 120. The label block 146 may include an opaque surface configured to be marked with indicia 149, e.g., using a printer or a writing instrument such as a pen, pencil, or marker. Thus, the block label 146 may provide information regarding the liner assembly 120 and the beverage contained therein.

In a further example, the liner assembly 120 may include one or more handles 183, as shown in FIG. 16A. The handles 183 may facilitate the opening and closing of the upper portion of the liner assembly 120. The handles 183 may facilitate the removal of the liner assembly 120 from the vessel 110 and the moving and handling of liner assembly 120. Handles 183 may be integrated into liner 140. Handles 183 stamped during manufacturing of liner 140 or affixed afterwards. Handles 183 may be positioned in any orientation with respect to liner 140.

Figure 17:
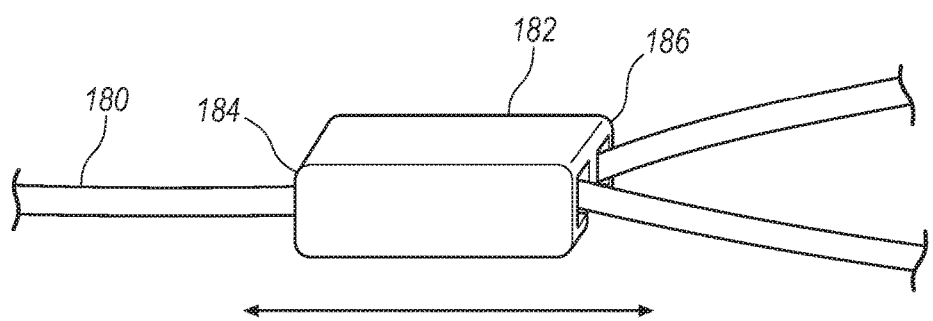
FIG. 17 illustrates a closer, perspective view of the slide lock of FIGS. 16A and 16B.

With reference to FIG. 17, the slide lock 182 a unitary or a multi-component body. The slide lock 182 may include a closing end 184 and an opening end 186. The closing end 184 may apply an inward force to urge the integrated closure mechanism 180 together when the slide lock 182 is moved in the direction of the closing end 184. The opening end 186 may apply an outward force to separate the integrated closure mechanism 180 when the slide lock 182 is moved in the direction of the opening end 186. Thus, the integrated closure mechanism 182 may selectively seal the liner assembly 120 depending on the position of the slide lock 182.

Figure 18:
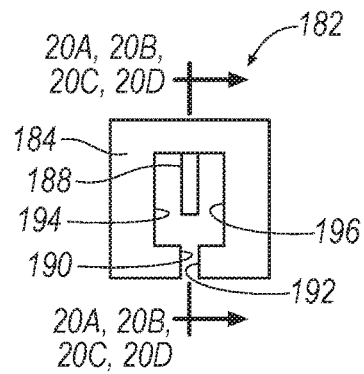
FIG. 18 illustrates a back view of the slide lock of FIG. 17.
Figure 19:
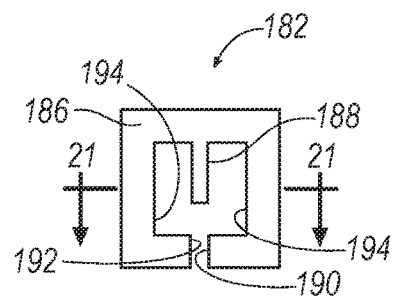
FIG. 19 illustrates a front view of the slide lock of FIG. 17.
Figure 20A:
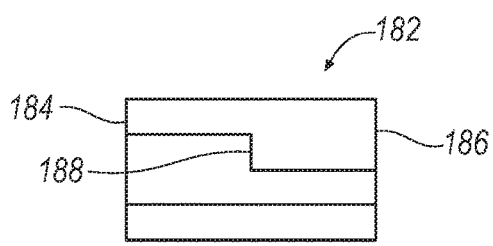
FIG. 20A illustrates a vertical section view of a slide lock of FIG. 18.
Figure 20B:
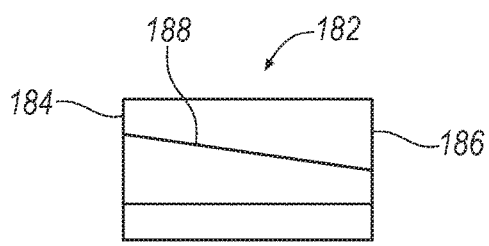
FIG. 20B illustrates a vertical section view of an alternative slide lock of FIG. 18.
Figure 20C:
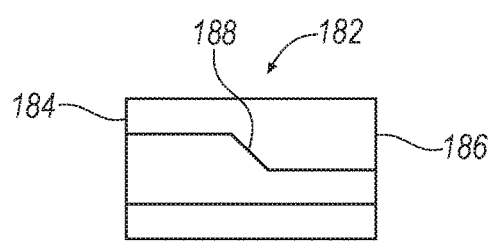
FIG. 20C illustrates a vertical section view of an alternative slide lock of FIG. 18.
Figure 20D:
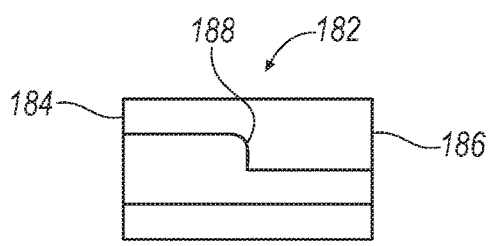
FIG. 20D illustrates a vertical section view of an alternative slide lock of FIG. 18.
Figure 21:
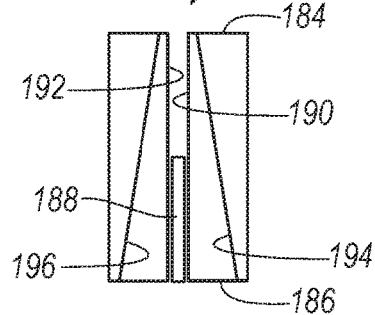
FIG. 21 illustrates a horizontal section view of a slide lock of FIG. 19.

Referring to FIGS. 18-21, the slide lock 182 may include features to facilitate the inward and outward forces. As shown in FIGS. 18-19, the slide lock 182 may include a divider 188, e.g., to separate and provide the outward force to separate the integrated closure mechanism 180, and may include lower arms 190, 192, e.g., to provide an inward force on the liner 140 and to slide against and facilitate closure of the portions of liner 140 that are adjacent to integrated closure mechanism 180. The divider 188 may include any profile configured to selectively separate the integrated closure mechanism 180, e.g., a right angle step profile as shown in FIG. 20A, a tapered ramp profile as shown in FIG. 20B, a tapered step profile as shown in FIG. 20C, a curved step profile as shown in FIG. 20D, or a combination thereof. As shown in FIG. 21, the slide lock 182 may include sidewalls 194, 196, e.g., to provide the inward force to the integrated closure mechanism 180, and may taper outwards from the closing end 184 to the opening end 186, e.g., to facilitate the inward force and closure at the closing end 184 and the outward force and separation at the opening end 186.

The slide lock 182 may be configured to provide safety or tamper-resistant features. For example, the slide lock 182 may include a first loop member and the liner 140 may have a second loop member, adjacent the slide lock 182 when in the closed configuration. The first and second loop members may be secured relative to each other in the closed position with a lock or a one-way zip tie through the first and second loop members. The lock or zip tie may be cut or otherwise removed to provide the open configuration. Thus, tamper resistance may be provided by the slide lock 182. The slide lock 182 may include slider and seal arrangements that may include child resistant systems, e.g., a child resistant easy open (CREO) system may be utilized to facilitate multiple uses of the liner assembly 120 throughout the day.

With reference to FIGS. 22A and 22B, the integrated closure mechanism 180 may be a hook and loop type fastener. As shown in FIG. 22A, the integrated closure mechanism 180 may include a first portion 179 configured to selectively receive and release a second portion 181, thereby providing a seal therebetween. As shown in FIG. 22B, the integrated closure mechanism 180 may include a plurality of the same or different types of closure mechanism. For example, the integrated closure mechanism 180 may include a hook and loop fastener with first portion 179B and second portion 181B disposed between the interlocking ridges of first portion 179A and second portion 181A and the interlocking ridges of first portion 179C and second portion 81C. Thus, any combination of integrated closure mechanisms may provide one or more seals.

The liner assembly 120 may be configured to fail in the event of disassembly. For example with reference to FIG. 23, the tube 130 may include a protrusion 131 and the cuff 160 may include a recess 161, thereby forming a mechanical interlock that allows movement in a first longitudinal direction for assembly but obstructs movement in a second longitudinal direction to obstruct or fail in the event of disassembly. Alternatively or in addition, a cross-section of the cuff 160, liner 140, and/or tube 130 may have a plastic strain or failure stress capacity (e.g., in a longitudinal or torsional direction) that is less than a plastic strain or failure stress capacity of the interlock, e.g., a mechanical interlock or a chemical interlock such as an adhesive. The mechanical interlock may also include a smooth surface, a textured surface, a barbed surface, a press fit connection, or fish hook type connection between the mating surfaces between any or all of the cuff 160, liner 140, and tube 130, e.g., such that an outer diameter of the cuff 160 may be positioned into an inner diameter of the tube 130 so as to provide frictional or obstructive binding therebetween. Thus, in response to disassembly, the liner assembly 120 may fail, thus providing tamper resistance.

Figure 24:
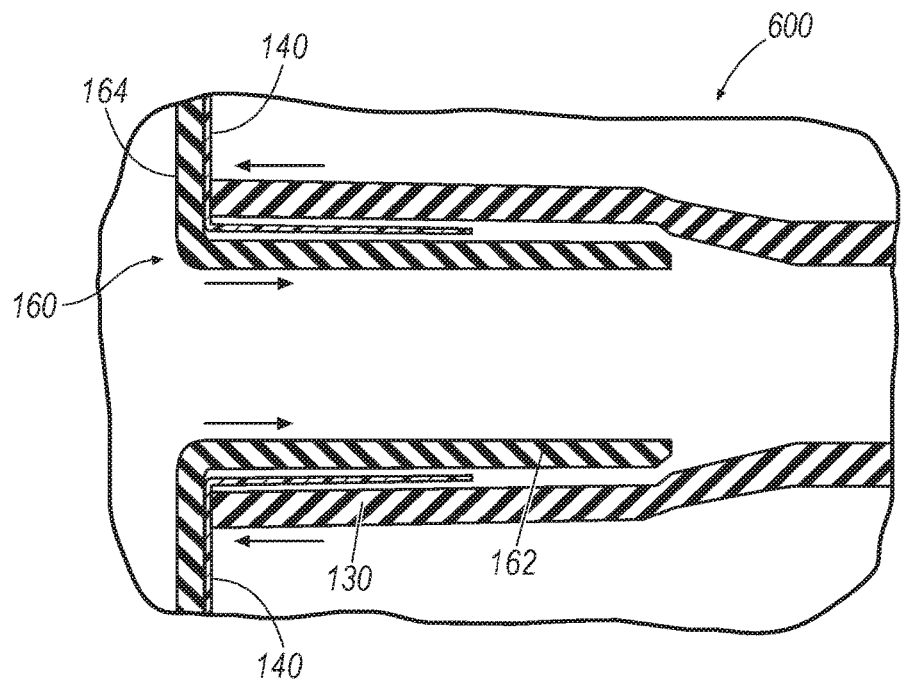
FIG. 24 illustrates an enlarged side view of a method of providing a permanent or tamper-resistant connection.
Figure 25:
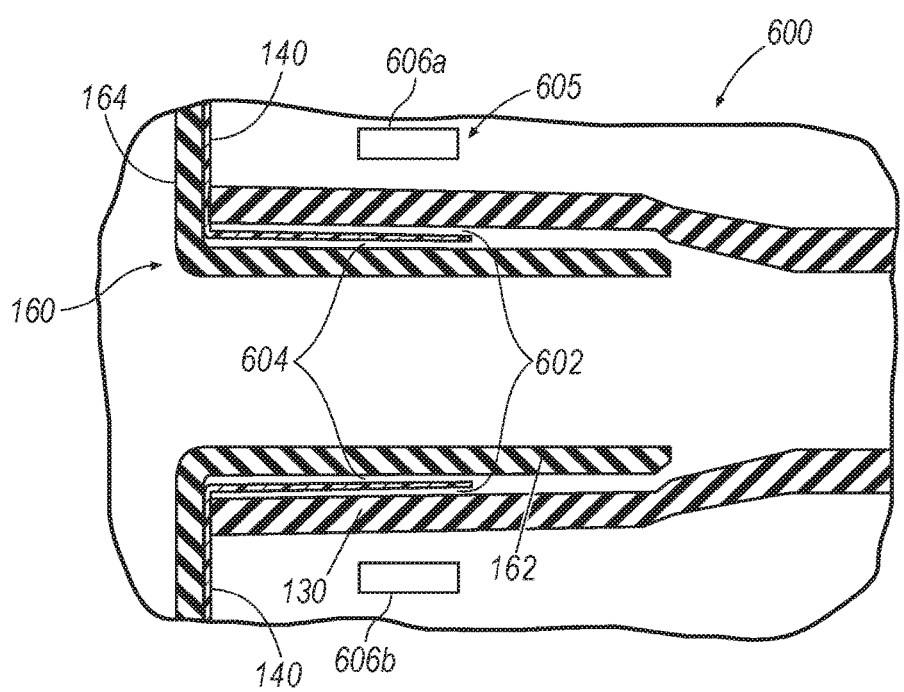
FIG. 25 illustrates another enlarged side view of a method of providing a permanent or tamper-resistant connection.
Figure 26:
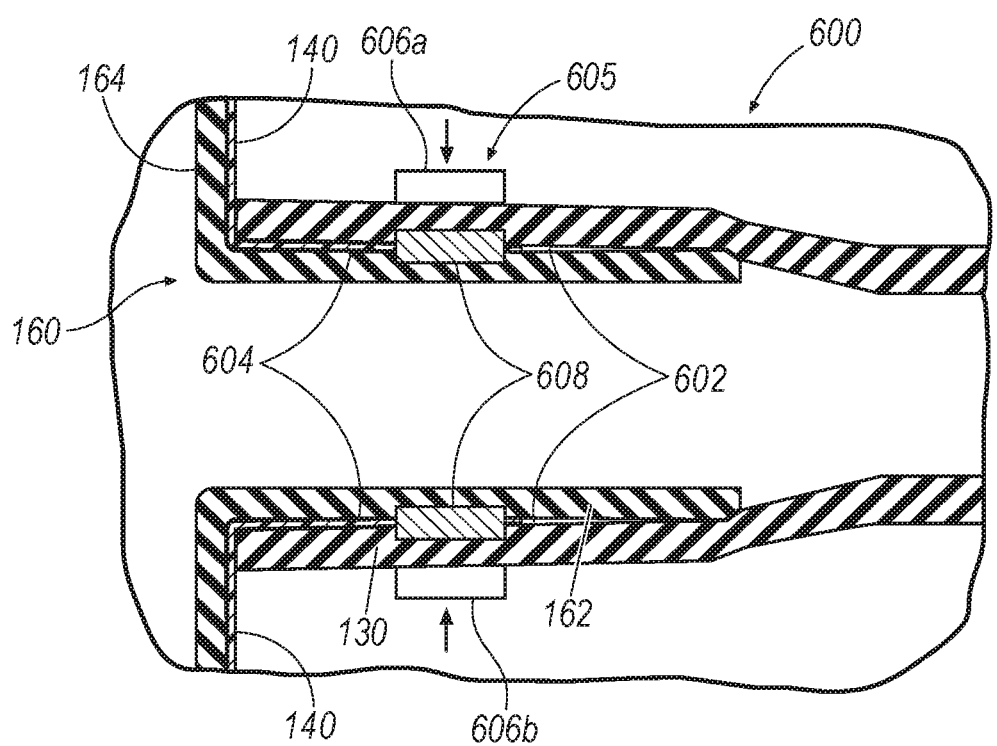
FIG. 26 illustrates another enlarged side view of a method of providing a permanent or tamper-resistant connection.

With reference to FIGS. 24-26, system 600 may include a permanent or tamper-resistant connection formed by a mechanical interlock or by heat or cold forming, for example, as discussed above. FIG. 24 illustrates cuff 160 being moved against and through liner 140 and into tube 130. Thus, cuff 160 may urge the liner 140 into and against the tube 130, thereby holding the liner 140, cuff 160, and tube 130 relative to each other, e.g., forming a tamper resistant connection with fluid tight seal that is destroyed upon disassembly.

FIG. 25 illustrates a tool 605 positioned relative to and configured to be positioned about the tube 130, liner 140, and cuff 160 and generate a bonded connection to permanently melt, weld, or join any or all of the tube 130, liner 140, and cuff 160 together. For example, energy source 606 may include a mandrel shape and may be configured to engage an outer surface of the tube 130. The tool 605 may include a mandrel configured as a clamp with end effectors 606a and 606b that may be opposing and configured to be positioned about and apply a force (e.g., radially inward) to the tube 130, liner 140, and cuff 160. Alternatively, the tool 605 may include a mandrel with a single end effector 606 (not shown) configured to be positioned against a rigid object or anchor and apply a force (e.g., radially inward) relative to the tube 130, liner 140, and cuff 160.

As shown in FIG. 26, the tool 605 may be configured to provide a force (e.g., radially inward) while applying energy such as thermal energy, friction energy, vibratory energy, or a combination thereof, thereby providing a bonded connection including a heat-formed or cold-formed connection as discussed above. The tool 605 may be configured to apply thermal or vibratory energy along all or any portion of any of its surfaces. The tool 605 may apply energy for a time period (e.g., predefined) and at a temperature and a pressure (e.g., constant) such that at least the contact areas between the tube 130, liner 140, and cuff 160 are heated. As a result, the tube 130, liner 140, and cuff 160 may be bonded or joined together (e.g., permanently).

The tool 605 may be configured to transfer the heat to bonding regions 608 while minimizing plastic deformation or melting of an inner surface of cuff 160 and an outer surface of the tube 130. For example, the tool 605 may apply energy in the range of about 300-600° F. for a time period in the range of 1-30 seconds, e.g., about 400° F. for about 15 seconds or about 500° F. for about 6 seconds. The tool 605 may include any device configured to apply heat, friction, or vibration to thermally melt, weld, or join any or all of the tube 130, liner 140, and cuff 160, e.g., to generate a unitary, integrated, and/or single piece liner assembly 120 as discussed above. The tool 605 may include a radiofrequency (RF), ultrasonic energy, hot bar, or impulse device. Alternatively, solvent bonding may be utilized to chemically join any or all of the tube 130, liner 140, and cuff 160.

Any or all of the tube 130, liner 140, and cuff 160 may include thermoplastic materials. An exemplary tube 130 may include styrene-ethylene butylene-styrene (SEBS) block copolymer, polypropylene (PP), or a combination thereof or any other material with a melt range of about 360-400° F. An exemplary liner 140 may include linear low-density polyethylene (LLDPE), low-density polyethylene (LDPE), nylon, or a combination thereof or any other material having a melt range of about 219-400° F. An exemplary cuff 160 may include polyolefin elastomer (POE) or any other material having a melt range between any two of about 205, 225, and 250° F., configured for boiling fill at or above about 212° F. followed by ambient cooling, or configured to receive fluid at or above about 185° F.

Figure 27:
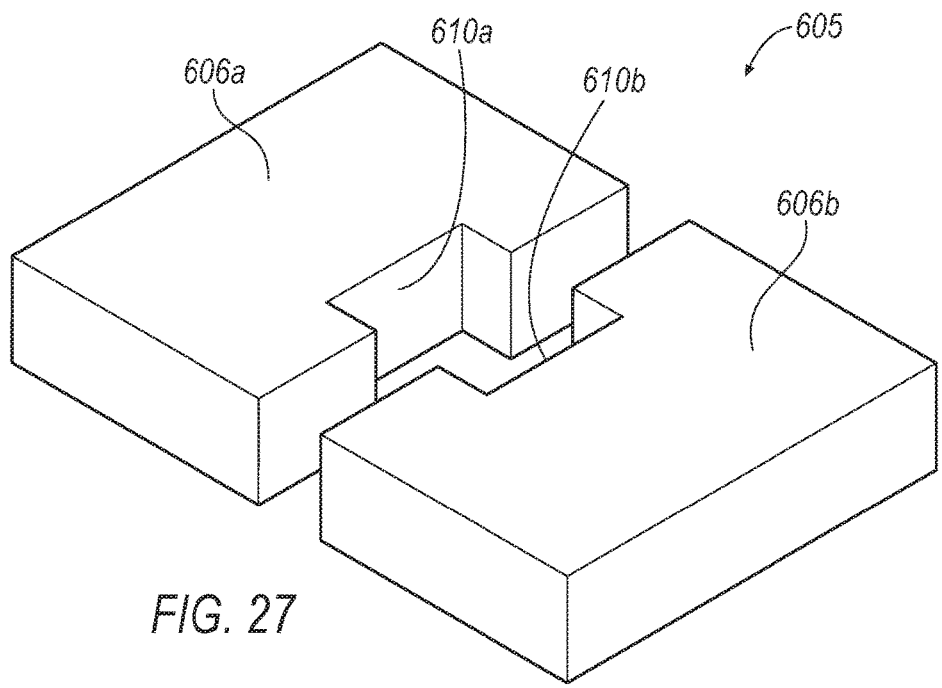
FIG. 27 illustrates a perspective view of a tool, e.g., having one or more end effectors with a recess.
Figure 28:
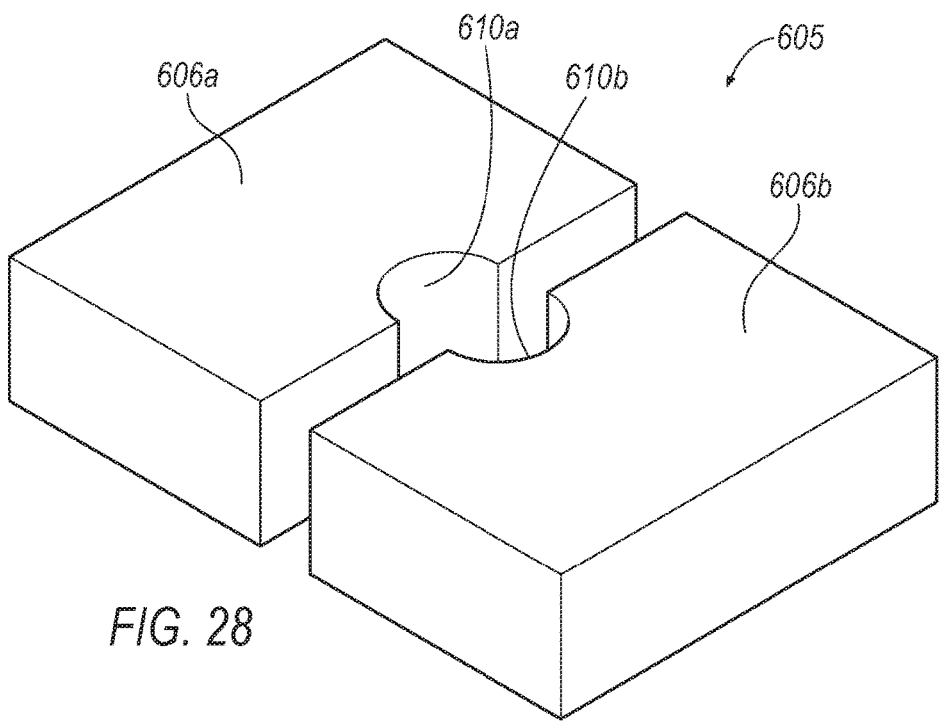
FIG. 28 illustrates a perspective view of another tool, e.g., having one or more end effectors with an alternative recess.
Figure 29:
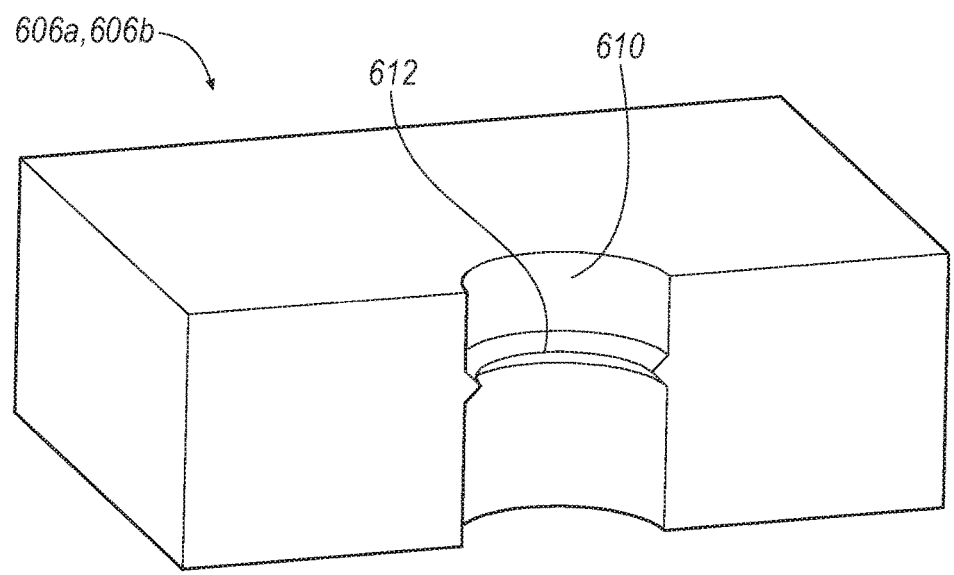
FIG. 29 illustrates a perspective view of another tool, e.g., having one or more end effectors with an extrusion.
Figure 30:
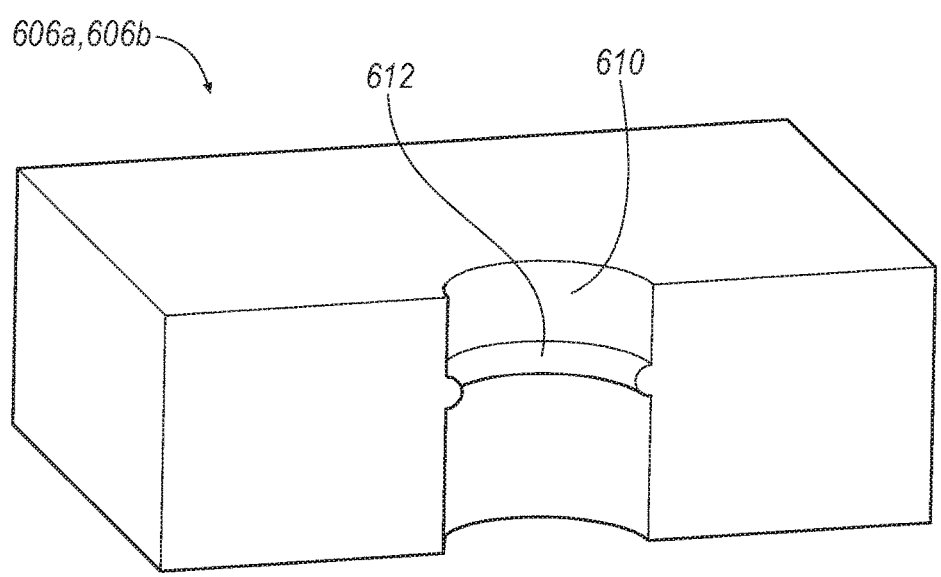
FIG. 30 illustrates a perspective view of another tool, e.g., having one or more end effectors with an alternative extrusion.
Figure 31:
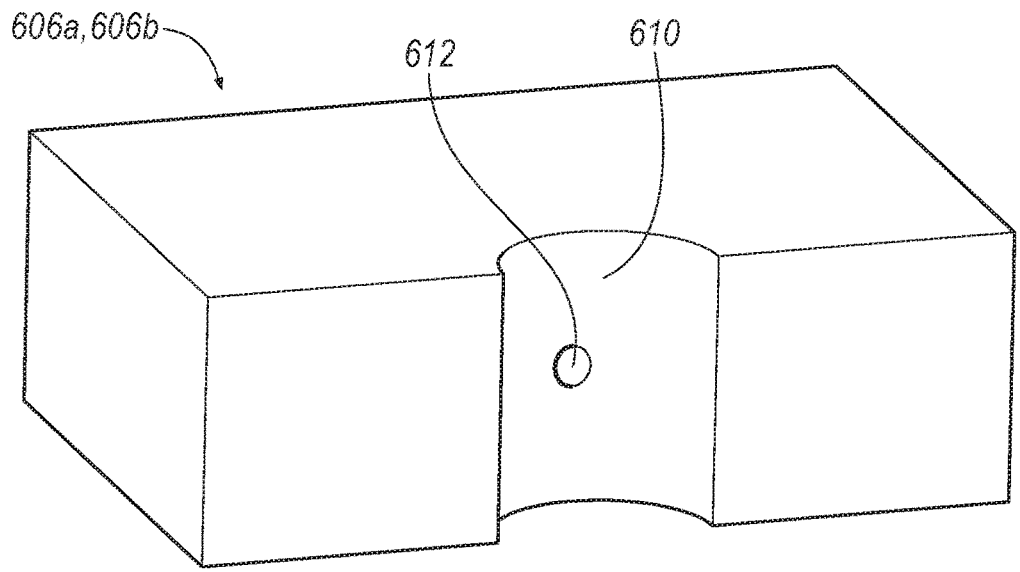
FIG. 31 illustrates a perspective view of another tool, e.g., having one or more end effectors with an alternative extrusion.

As shown in FIGS. 27-31, the tool 605 may include one or more end effectors 606a/b configured to apply thermal or vibratory energy along all or any portion of any of its surfaces. Each end effector 606a/b may include a recess 610 configured to transfer heat, friction, or vibration to thermally melt, weld, or join any or all of the tube 130, liner 140, and cuff 160. Recess 610 may include any shape, e.g., a flat or rectangular shape as shown in FIG. 27 or a round shape as shown in FIG. 28. Further, each end effector 606a/b may include an extrusion 612 that extends inward from the recess 610 may include any shape, e.g., a circumferential band with a triangular profile as shown in FIG. 29, a circumferential band with a rounded or semi-circular profile as shown in FIG. 30, or a hemispherical dimple as shown in FIG. 31.

Figure 32:
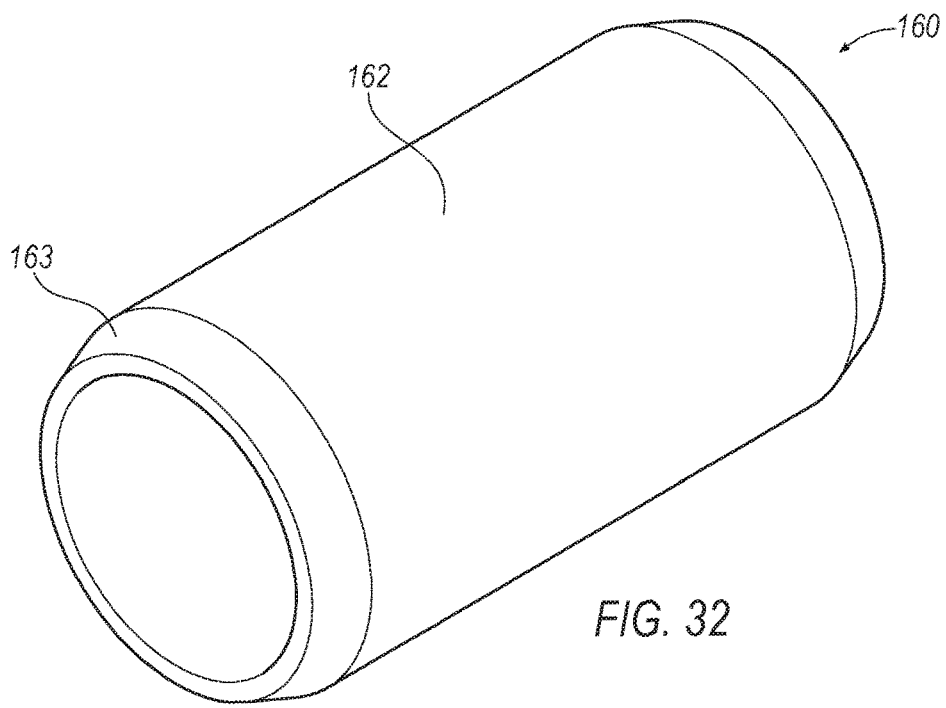
FIG. 32 illustrates a perspective view of an alternative cuff.
Figure 33:
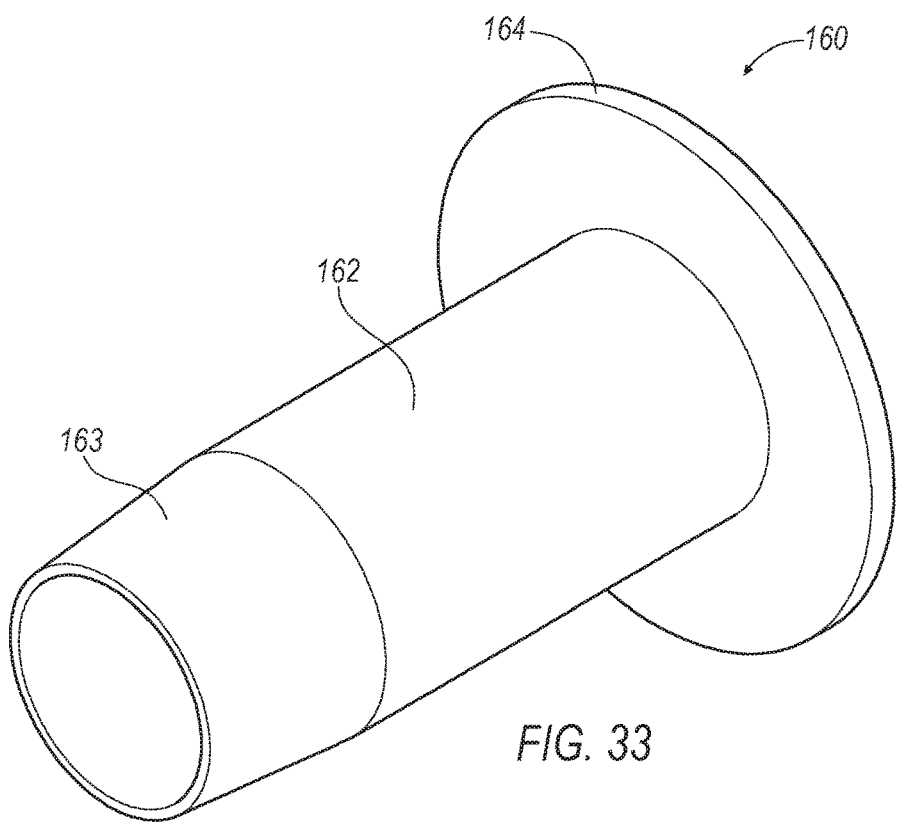
FIG. 33 illustrates a perspective view of an alternative cuff.
Figure 34:
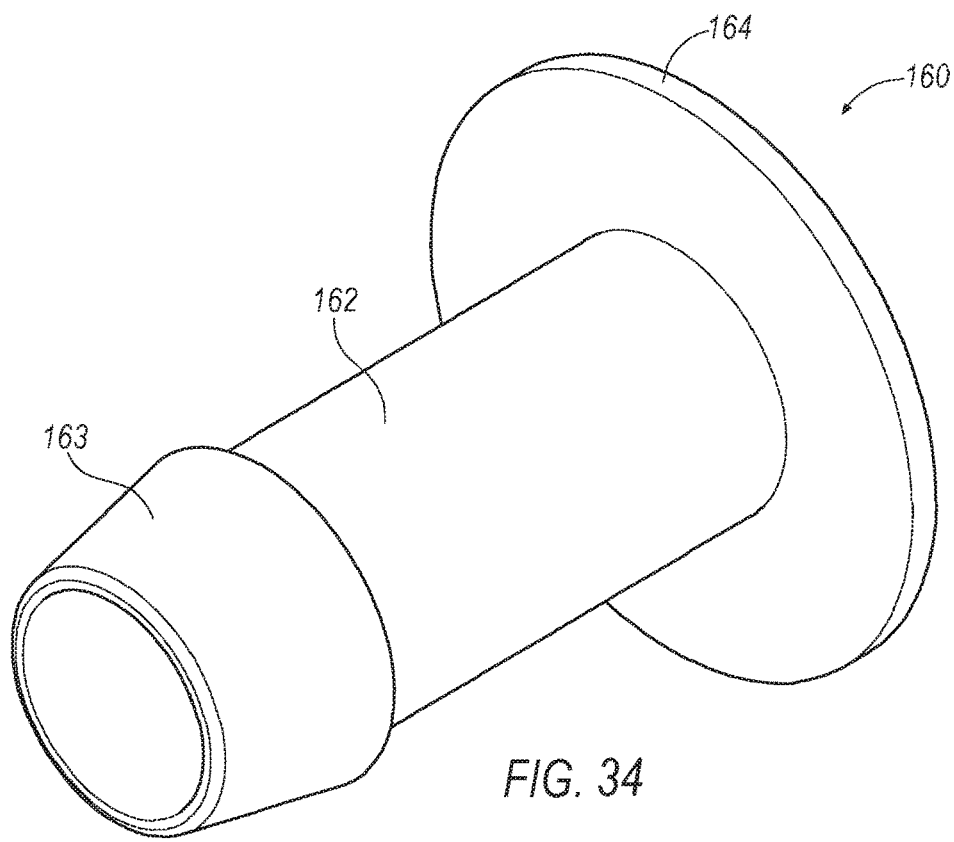
FIG. 34 illustrates a perspective view of an alternative cuff.
Figure 35:
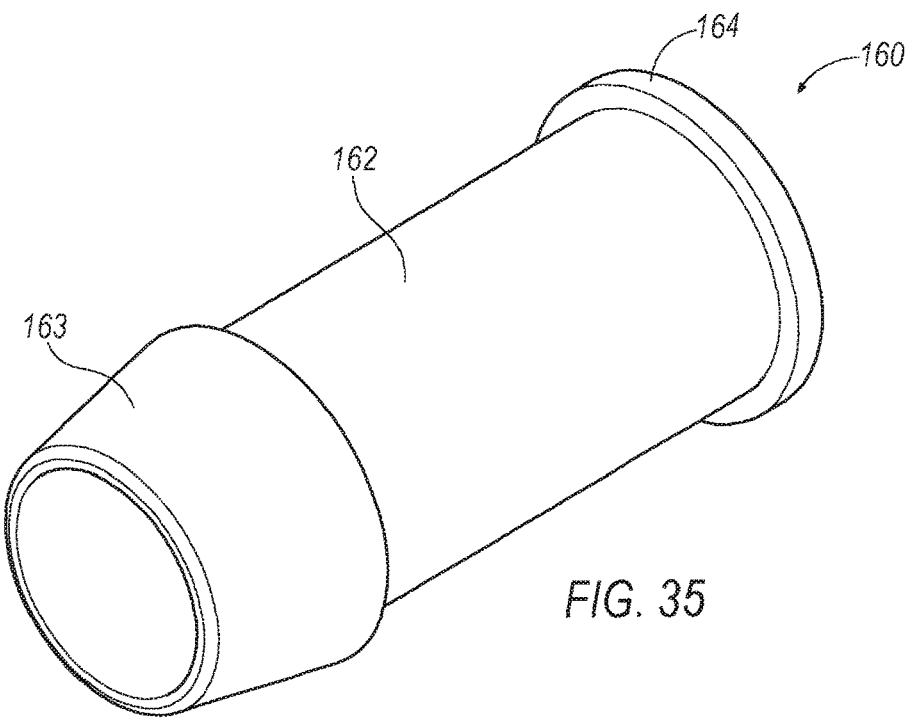
FIG. 35 illustrates a perspective view of an alternative cuff.
Figure 36:
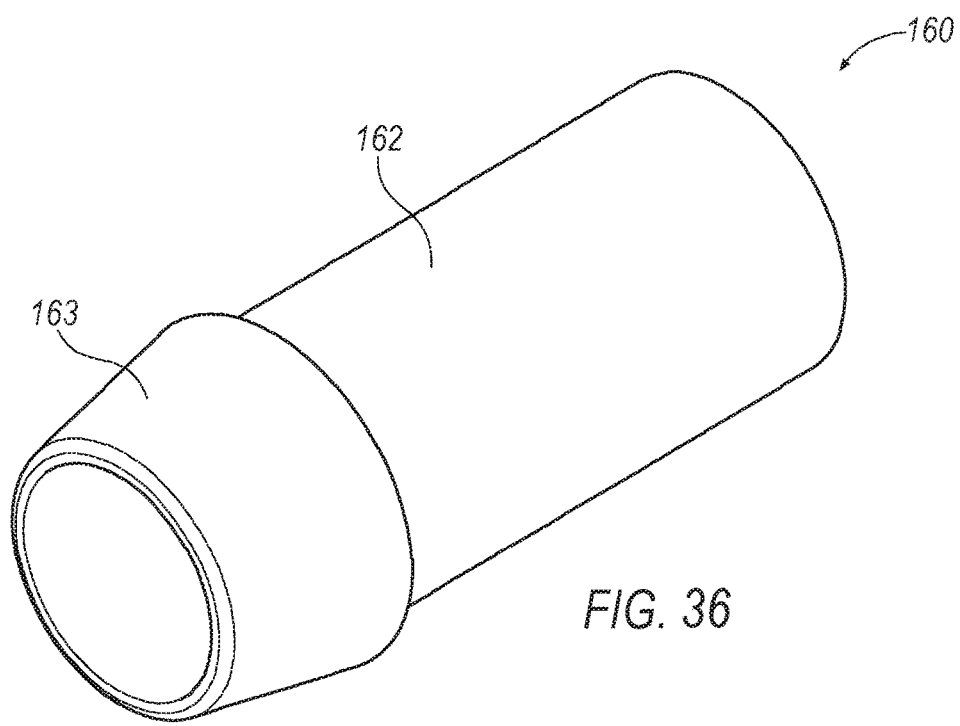
FIG. 36 illustrates a perspective view of an alternative cuff.
Figure 37:
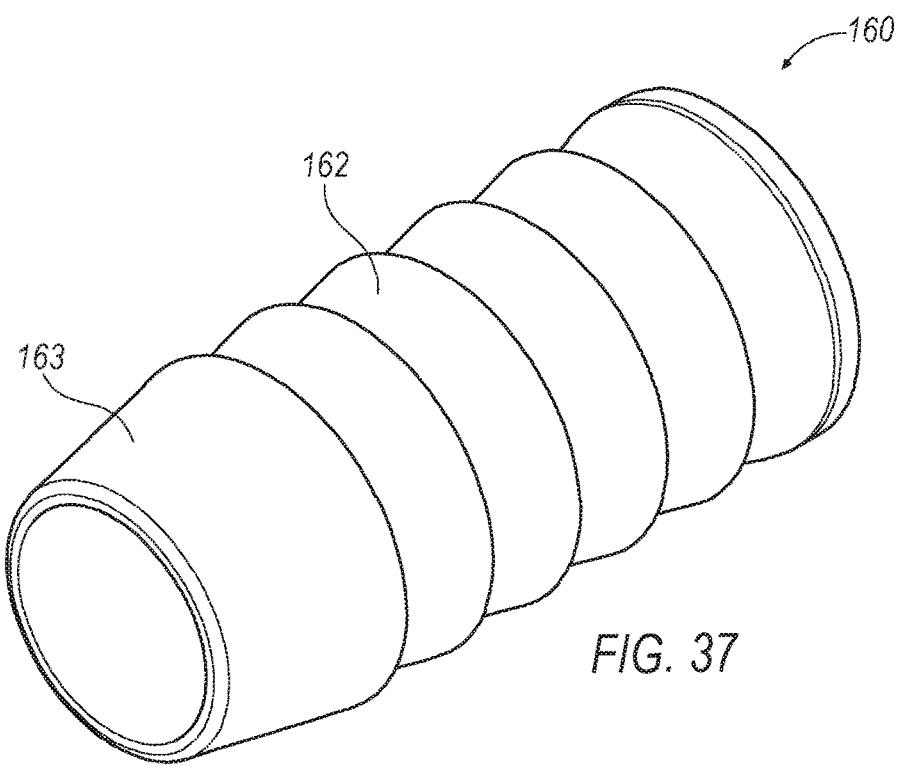
FIG. 37 illustrates a perspective view of an alternative cuff.
Figure 38:
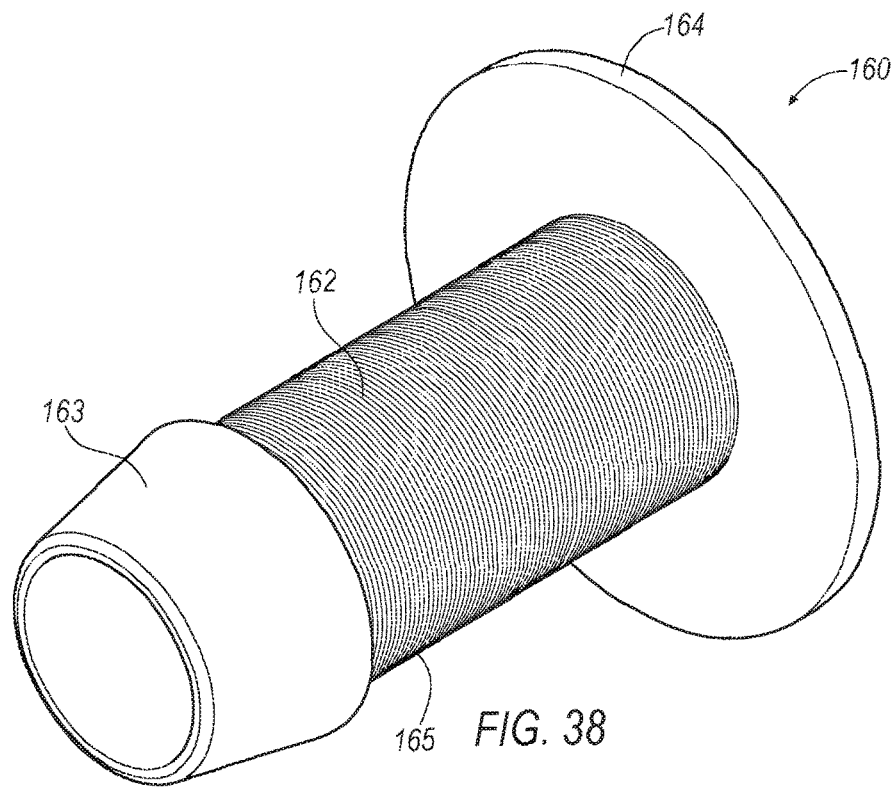
FIG. 38 illustrates a perspective view of an alternative cuff.
Figure 39:
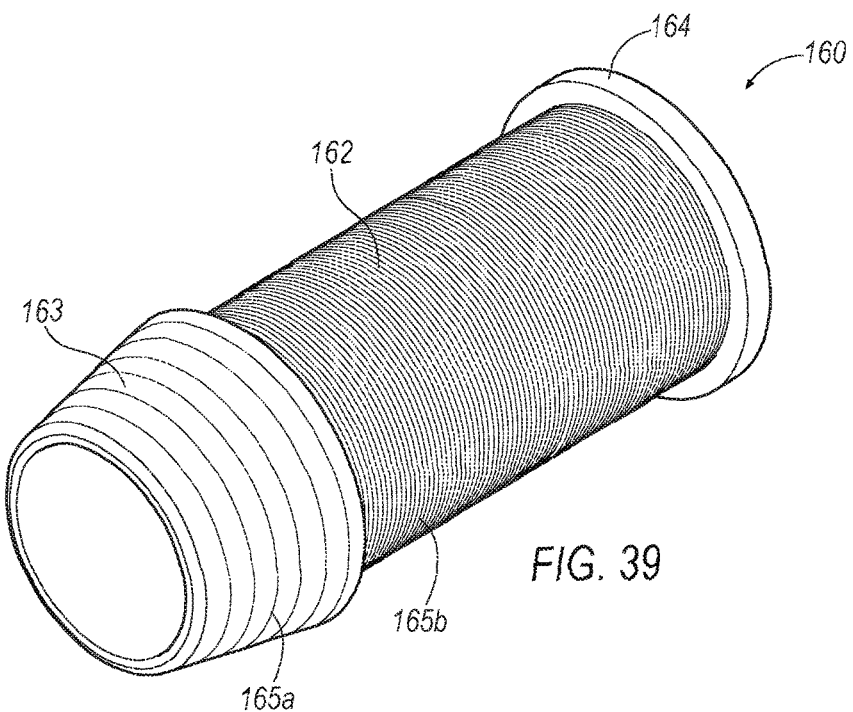
FIG. 39 illustrates a perspective view of an alternative cuff.
Figure 40:
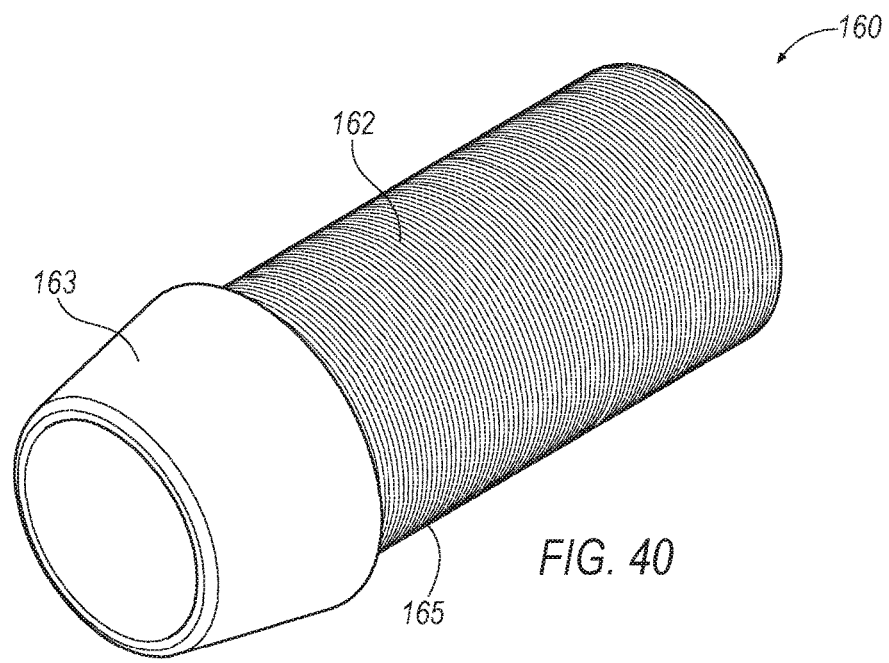
FIG. 40 illustrates a perspective view of an alternative cuff.
Figure 41:
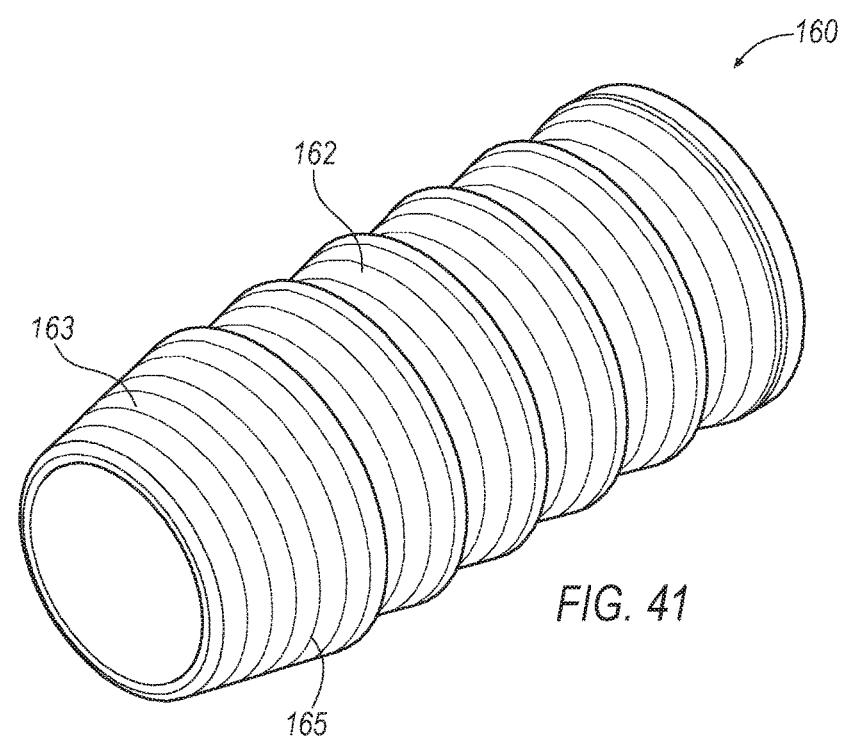
FIG. 41 illustrates a perspective view of an alternative cuff.

Referring to FIGS. 32-41, the cuff 160 may include a number of different configurations. As discussed above, the cuff 160 may include an interlock surface 162 that is smooth as shown in FIGS. 32-36 or that is ribbed, grooved, barbed, or textured features 165 as shown in FIGS. 38-41. Cuff 160 may include a leading end 163 that tapers inward from the interlock surface 162 as shown in FIGS. 32-33. For example, feature 165a may be circumferentially or axially positioned on leading end 163 and feature 165b may be circumferentially or axially positioned on interlock surface 162. Cuff 160 may include a barb, e.g., in the form of a conical protrusion from the interlock surface 162 that tapers inward as shown in FIGS. 34-41. Cuff 160 may include a leading end 163 that is smooth as shown in FIGS. 32-37, 38, and 40 or textured as shown in FIGS. 39 and 41. Cuff 160 may include a flange 164 that is extended as shown in FIGS. 34 and 38, shortened as shown in FIGS. 35 and 39, or no flange as shown in FIGS. 36 and 40. Cuff 160 may also include a plurality of barbs, e.g., a leading end 163 with a conical protrusion that repeats along the interlock surface 162 as shown in FIGS. 37 and 41. The liner 140 may be positioned between the tube 130 and the leading end 163 of the cuff 160, thereby elastically or plastically deforming any or all of the tube 130, liner 140, and cuff 160 together. Such elastic or plastic deformation may be facilitated by or in addition to heat or cold forming any or all of the tube 130, liner 140, and cuff 160 together. In addition, cuff 160 may include any combination of the above.

In another embodiment, the liner assembly 120 may be assembled without a cuff 160. For example, the tube 130 may be positioned between first and second layers of the liner 130. The liner 130 may be connected to or hermetically sealed to an outer surface of the tube 130, e.g., using a heat seal as discussed above. Thus, the tube 130 may be positioned between the first and second layers of the liner 130. As a result, the liner assembly 120 may include liner 130 and tube 130, e.g., without cuff 160.

Referring to FIG. 42, the cuff 160 may be positioned over locating stud 161 of an assembly tool or platform 163. The liner 140 may be positioned over locating stud 163, cuff 160, and liner 140. The cuff 160 may include an inner surface having a passage for receipt of liquid from the liner 140 and an outer surface that is dimensioned and configured to be received in and outwardly stretch and expand an inner surface of the tube 130. The cuff 160 may be configured to be positioned with an axial force along the tube 130 and may be configured to expand the tube 130 thereby placing an outward force against the liner 140 and toward the inner surface of tube 130. In reaction, the tube 130 may place an inward force against the liner 140 and toward the outer surface of the cuff 160. Thus, the liner assembly 120 may be cold-formed or heat-formed with the axial force, outward force, inward force, or a combination thereof, thereby creating an interlock between the tube 130, liner 140, and cuff 160. Accordingly, the liner 140 may be held between the tube 130 and the cuff 160 thereby providing a permanent or tamper-resistant connection between the cuff 160, liner 140, and tube 130 that may not be removed without at least partially destroying at least a portion of the liner 140, e.g., that cannot be reassembled to form a functional liner assembly 120. The structure of liner assembly 120 results in an outer seal between the tube 130 and liner 140 and an inner seal between the liner 140 and cuff 160. If the seal is tampered with, the consumer can visually inspect the seal to determine the condition of the liner assembly 120.

Figure 43:
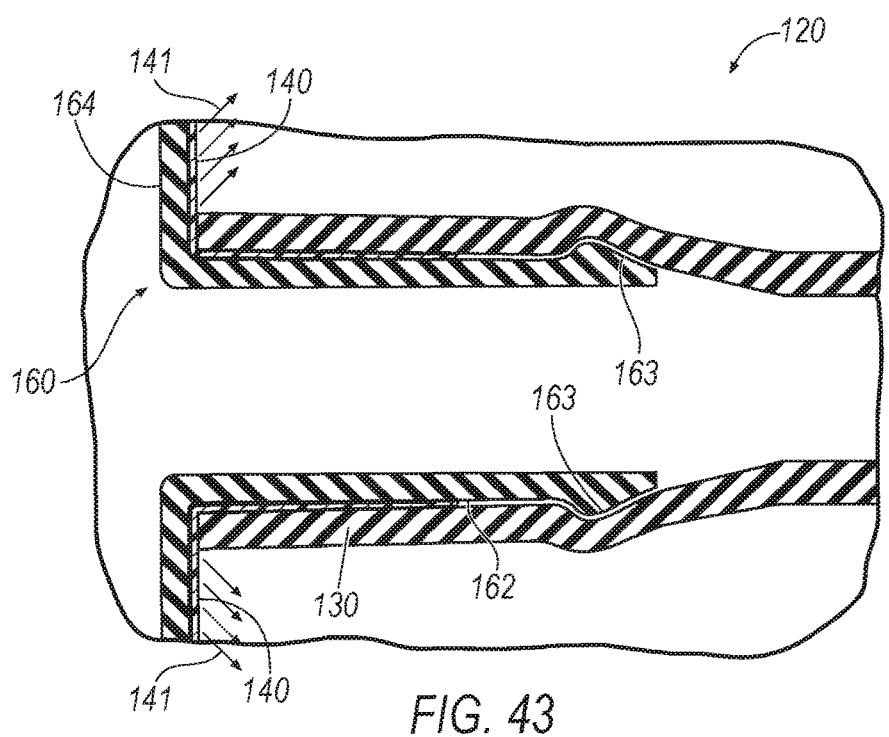
FIG. 43 illustrates an enlarged side view, for example, of a liner assembly in an assembled condition.
Figure 44:
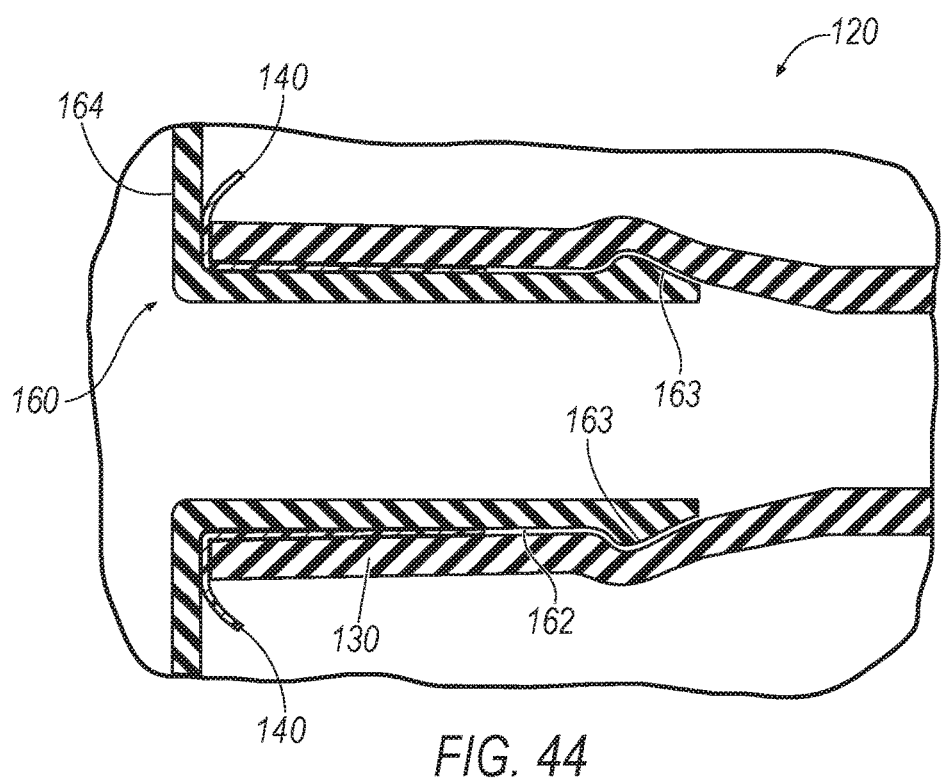
FIG. 44 illustrates an enlarged side view, for example, of a liner assembly in a disassembled condition.

FIGS. 43-44 illustrate disassembly of the liner assembly 120. A disassembly force may be applied to liner 140 relative to the liner 140 and cuff 160 in an assembled condition as shown in FIG. 43. For example, leading end 163 of cuff 160 may apply a radially outward force on the tube 130, e.g., thereby elastically or plastically deforming the tube 130, liner 140, and cuff 160 together with the liner 140 extending between the tube 130 and cuff 160. The tamper-resistant connection may include a tamper evident connection, e.g., that provides a connection or seal with an indicator that is visible or visually indicates disassembly or a tampered condition and prohibits or obstructs reassembly after the seal is broken. For example, the tamper evident connection may secure the liner 140 between the tube 130 and cuff 160 such that a disassembly force 141 (e.g., in an axial, diagonal, or radially outward direction) results in a disassembled condition in which a liner body of the liner 140 tearing or otherwise separating from a visual indictor portion of the liner 140 that remains secured between the tube 130 and cuff 160 as shown in FIG. 44. As such, the liner assembly visually indicates tampering with the visual indictor portion of liner 140 extending from and interposed between the tube 130 and cuff 160. The tamper resistant connection includes the interlock which creates a seal that is tamper evident and prohibits reassembly after the seal is broken. The connection further includes an indicator that shows if the liner assembly has been tampered with, e.g., in response to at least partially damaging at least one of the tube 130, liner 140 and cuff 160. If a consumer identifies a tampered condition, then it can dispose of the liner and deploy a new liner into an urn.

It will be appreciated that the aforementioned method and devices may be modified to have some components and steps removed, or may have additional components and steps added, all of which are deemed to be within the spirit of the present disclosure. Even though the present disclosure has been described in detail with reference to specific embodiments, it will be appreciated that the various modifications and changes can be made to these embodiments without departing from the scope of the present disclosure as set forth in the claims. The specification and the drawings are to be regarded as an illustrative thought instead of merely restrictive thought.

What is claimed is:
1. A beverage system comprising:
 a vessel having a spigot with a spigot passage configured to receive at least a portion of a liner assembly, the liner assembly including:
 a flexible liner positionable in the vessel,
 a flexible tube positionable in the spigot passage, and
 a rigid cuff disposed through the flexible liner and into at least a portion of the flexible tube while outwardly expanding the flexible tube to form a tamper evident connection between the tube, liner, and cuff forming a fluid passage therethrough,
 wherein the tamper evident connection provides a cold-formed connection between the cuff, liner, and tube that is at least partially destroyed in response to disassembly, thereby hindering further functioning of the liner assembly and providing a visual indictor portion of the liner extending from and interposed between the tube and the cuff.

2. The system of claim 1, wherein the tamper evident connection joins the tube, liner, and cuff to provide a single piece liner assembly.

3. The system of claim 1, wherein cuff includes an interlock surface with a plurality of at least one of barbs and ribs configured as conical protrusions that repeat along the interlock surface.

4. The system of claim 1, wherein the interlock surface is secured relative to the liner with at least one of a cold-formed connection and a heat formed connection.

5. The system of claim 1, wherein the tamper evident connection between the tube, liner, and cuff is provided by a tool that provides at least one of a cold-formed connection and a heat formed connection.

6. The system of claim 5, wherein the tool provides the tamper evident connection by applying a radially inward force while applying at least one of thermal energy and vibratory energy to the tube, liner, and cuff.

7. The system of claim 1, wherein the tamper evident connection is formed by radially inward force applied by the an inward force from the elasticity of the tube and friction force between the tube, liner, and cuff, thereby creating a seal that is tamper evident and not able to be reassembled after the seal is broken.

8. The system of claim 1, wherein the liner assembly further includes an upper portion that is selectively sealable.

9. A method of manufacturing a liner assembly, the method comprising:
- positioning a cuff through a flexible liner and into a flexible tube to secure the liner between the cuff and the flexible tube to provide a fluid passage therethrough;
- positioning a tool relative to the flexible tube; and
- applying energy to provide a cold-formed connection while outwardly expanding the flexible tube thereby joining the flexible tube, flexible liner, and cuff together, wherein the connection is operable to indicate a tampered condition.

10. The method of claim 9, wherein the connection joins the tube, liner, and cuff to provide a single piece liner assembly.

11. The method of claim 9, wherein connection includes a tamper evident connection between the cuff, liner, and tube that is at least partially destroyed in response to disassembly.

12. A beverage system comprising:
- a flexible liner positionable in a vessel;
- a flexible tube positionable in a spigot passage of the vessel; and
- a rigid cuff disposed through the flexible liner and into at least a portion of the flexible tube while outwardly expanding the flexible tube to form a tamper evident connection between the tube, liner, and cuff forming a fluid passage therethrough,
- wherein the tamper evident connection provides a cold-formed connection between the cuff, liner, and tube that is at least partially destroyed in response to disassembly, thereby disabling further functioning of the liner assembly and providing a visual indictor portion of the liner extending from and interposed between the tube and the cuff.

13. The system of claim 12, wherein the tamper evident connection joins the tube, liner, and cuff to provide a single piece liner assembly.

14. The system of claim 12, wherein cuff includes an interlock surface with a plurality of at least one of barbs and ribs configured as conical protrusions that repeat along the interlock surface.

15. The system of claim 12, wherein the interlock surface is secured relative to the liner with at least one of a cold-formed connection and a heat formed connection.

16. The system of claim 12, wherein the tamper evident connection between the tube, liner, and cuff is provided by a tool that provides at least one of a cold-formed connection and a heat formed connection.

17. The system of claim 16, wherein the tool provides the tamper evident connection by applying a radially inward force while applying at least one of thermal energy and vibratory energy to the tube, liner, and cuff.

18. The system of claim 12, wherein the tamper evident connection is formed by radially inward force applied by an inward force from the elasticity of the tube and friction force between the tube, liner, and cuff, thereby creating a seal that is tamper evident and not able to be reassembled after the seal is broken.

19. The system of claim 12, wherein the liner assembly further includes an upper portion that is selectively sealable.

* * * * *